United States Patent
Park et al.

(10) Patent No.: US 12,405,375 B2
(45) Date of Patent: Sep. 2, 2025

(54) ACOUSTIC-BASED POSITIONING WITH DYNAMIC FREQUENCY PILOT TONE

(71) Applicant: QUALCOMM Incorporated, San Diego, CA (US)

(72) Inventors: Kee-Hyun Park, San Diego, CA (US); Mustafa Keskin, San Diego, CA (US); Sungrack Yun, Seongnam (KR)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 18/157,017

(22) Filed: Jan. 19, 2023

(65) Prior Publication Data

US 2024/0248202 A1 Jul. 25, 2024

(51) Int. Cl.
*G01S 15/10* (2006.01)
*G01S 7/539* (2006.01)
*G01S 15/62* (2006.01)

(52) U.S. Cl.
CPC ............ *G01S 15/104* (2013.01); *G01S 7/539* (2013.01); *G01S 15/62* (2013.01)

(58) Field of Classification Search
CPC ......... G01S 15/104; G01S 7/539; G01S 15/62
See application file for complete search history.

(56) References Cited

U.S. PATENT DOCUMENTS 9,794,724 B1 * 10/2017 Shintani .................... H04R 1/40
2017/0150254 A1 * 5/2017 Bakish .................... H04R 3/005
2018/0254852 A1 * 9/2018 Avivi .................... H04L 27/0002
2020/0284898 A1 * 9/2020 Nanzer .................. G01S 13/583
2022/0369265 A1 * 11/2022 He ..................... H04W 56/0065

FOREIGN PATENT DOCUMENTS

JP S6264973 A * 3/1987
JP 2012093142 A * 5/2012

OTHER PUBLICATIONS

International Search Report and Written Opinion—PCT/US2023/080773—ISA/EPO—Apr. 2, 2024.

* cited by examiner

*Primary Examiner* — Isam A Alsomiri
*Assistant Examiner* — Abdallah Abulaban
(74) *Attorney, Agent, or Firm* — QUALCOMM Incorporated

(57) ABSTRACT

Aspects presented herein may enable a wireless device to dynamically change the frequencies of its pilot tones based on the distance of one or more objects detected, thereby enabling the wireless device to utilize the advantages of both high frequency pilot tone and low frequency pilot tone. In one aspect, a wireless device transmits a first pilot tone at a first frequency. The wireless device detects whether there is an object within a specified distance of the wireless device based on a reflected signal of the first pilot tone. The wireless device transmits a second pilot tone at a second frequency based on at least one object being detected within the specified distance, where the second frequency is higher than the first frequency. The wireless device calculates a first distance of the at least one object with respect to the wireless device based the second pilot tone.

30 Claims, 19 Drawing Sheets

1700

1702 Transmit a first pilot tone at a first frequency

1704 Detect whether there is an object within a specified distance of the wireless device based on a reflected signal of the first pilot tone

1706 Transmit a second pilot tone at a second frequency based on at least one object being detected within the specified distance - the second frequency is higher than the first frequency

1708 Calculate a first distance of the at least one object with respect to the wireless device based the second pilot tone

1710 Stop transmitting the second pilot tone based on the at least one object being no longer within the specified distance

1712 Detect the at least one object includes a human and inject an inverse signal of the first pilot tone

1714 Transmit the first pilot tone with a longer periodicity if no object is detected within the specified distance of the wireless device in a specified time period

FIG. 17

ACOUSTIC-BASED POSITIONING WITH DYNAMIC FREQUENCY PILOT TONE

TECHNICAL FIELD

The present disclosure relates generally to communication systems, and more particularly, to a wireless communication involving positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits a first pilot tone at a first frequency. The apparatus detects whether there is an object within a specified distance of the wireless device based on a reflected signal of the first pilot tone. The apparatus transmits a second pilot tone at a second frequency based on at least one object being detected within the specified distance, where the second frequency is higher than the first frequency.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 17 is a flowchart of a method of wireless communication.

DETAILED DESCRIPTION

Figure 1:
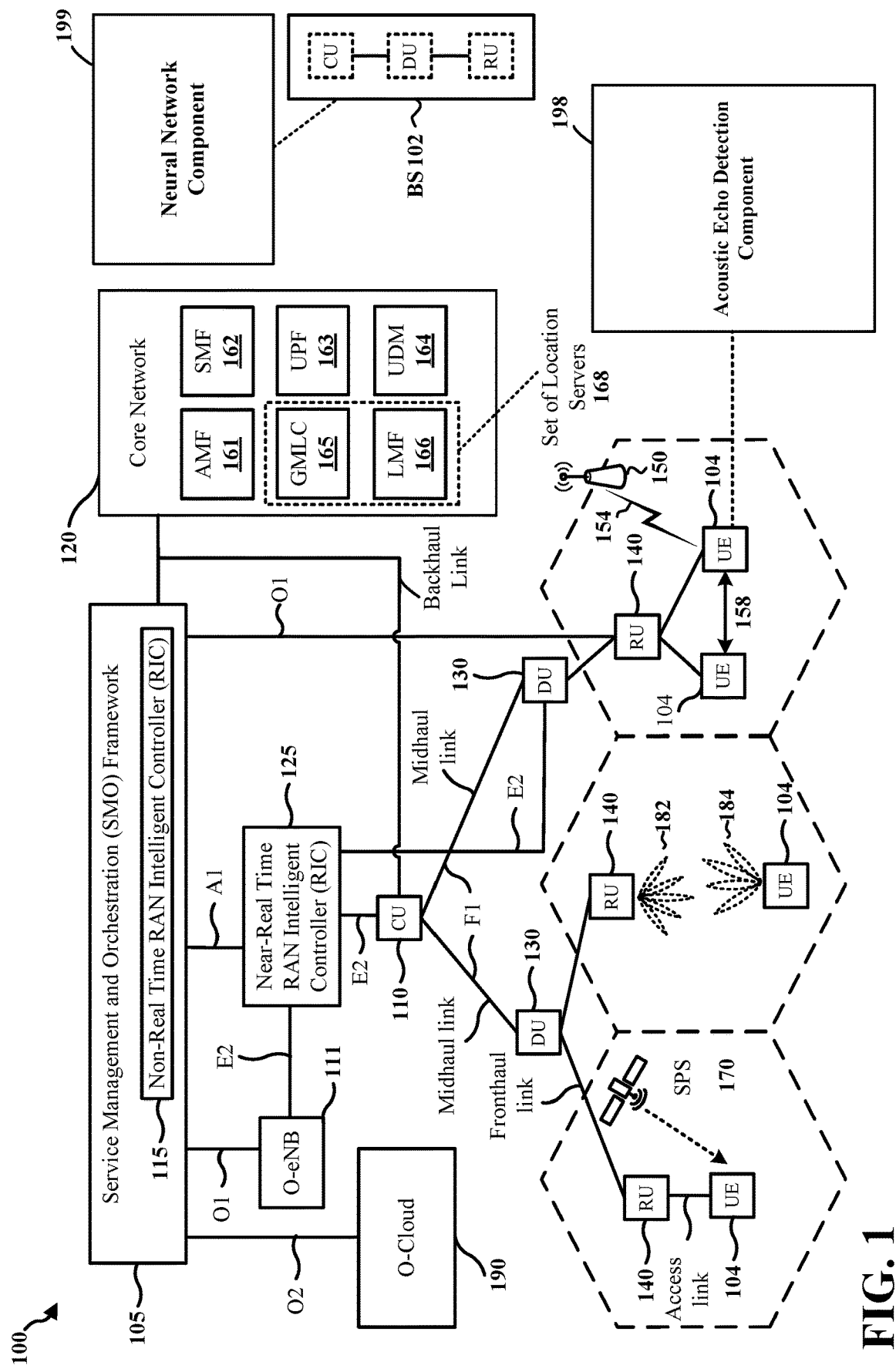
FIG. 1 is a diagram illustrating an example of a wireless communications system and an access network.

Aspects presented herein may improve the accuracy and reliability of distance detection for one or more objects based on acoustic echo detection. Aspects presented herein provide an acoustic echo detection system (which may also be referred to as a wireless device or a user equipment (UE) in some examples) that is capable of dynamically changing the frequencies of its pilot tones (e.g., its transmitting sound signals) based on the distance of one or more objects detected, thereby enabling the acoustic echo detection system to utilize the advantages of both nonaudible frequency pilot tone (e.g., capable of detecting object(s) with higher accuracy) and audible frequency pilot tone (e.g., capable of travelling longer detection distances). In some examples, a non-audible frequency pilot tone may indicate a pilot tone with a frequency above 20 kHz, which may also be referred to as a "high frequency pilot tone" for purposes of the present disclosure, whereas an audible frequency pilot tone may indicate a pilot tone with a frequency between 20 Hz and 20 kHz, which may also be referred to as a "low frequency pilot tone" for purposes of the present disclosure. In other words, aspects presented herein may provide a dynamic pilot tone system that is capable of recognizing short distance, mid distance, and long distance by changing frequencies of the pilot tone.

For example, in one aspect of the present disclosure, an acoustic echo detection system with a plurality of speakers (e.g., two or more speakers) may be configured to perform dynamic pilot tone frequency change, where one speaker may initially be configured to inject (e.g., transmit) a lower (or a base) frequency pilot tone (e.g., below 10 kHz) for a wider and longer range detection, and other speaker(s) may be configured to inject a higher frequency pilot tone (e.g., above 20 kHz) for narrow and short-range detection when an object is detected. This may provide a more accurate distance detection of the object depending on the location of the object. For example, if an object is detected to be closing to a speaker injecting the lower frequency pilot tone (e.g., based on the received echoes), the frequency of the pilot tone injected by this speaker may be increased (e.g., to a high frequency pilot tone) and at least one other speaker that is transmitting the higher frequency pilot tone may switch to transmitting the lower (base) frequency pilot tone instead. In some examples, the change/swap of pilot tone frequencies (e.g., between higher frequencies and lower frequencies pilot tones) among the plurality of speakers may be determined using a recurrent neural network (RNN) model. For example, an RNN model may be trained to determine whether an object is approaching to or moving away from a speaker (or an acoustic echo detection system). In another aspect of the present disclosure, if the acoustic echo detection system is injecting pilot tones with audible frequencies (e.g., 50 Hz~15 kHz—ideally 0 kHz~20 kHz is audible sound but 99% of people may hear just 50 Hz~15 kHz) and a human is detected in proximity to the acoustic echo detection system, the acoustic echo detection system may be configured to transmit/inject an active noise control (ANC) signal toward the direction of the human to reduce/cancel the sound/noise associated with the audible pilot tones. ANC, which may also be known as noise cancellation (NC) or active noise reduction (ANR), is a mechanism for reducing unwanted sound by the addition of a second sound specifically designed to cancel the first.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth®, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHZ), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth® signals, Ultrawideband (UWB) signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to transmit a first pilot tone at a first frequency; detect whether there is an object within a specified distance of the wireless device based on a reflected signal of the first pilot tone; and transmit a second pilot tone at a second frequency based on at least one object being detected within the specified distance, where the second frequency is higher than the first frequency (e.g., via the acoustic echo detection component 198). As further shown in FIG. 1, the base station 102 may include a neural network component 199.

Figures 2A, 2B, 2C, 2D:
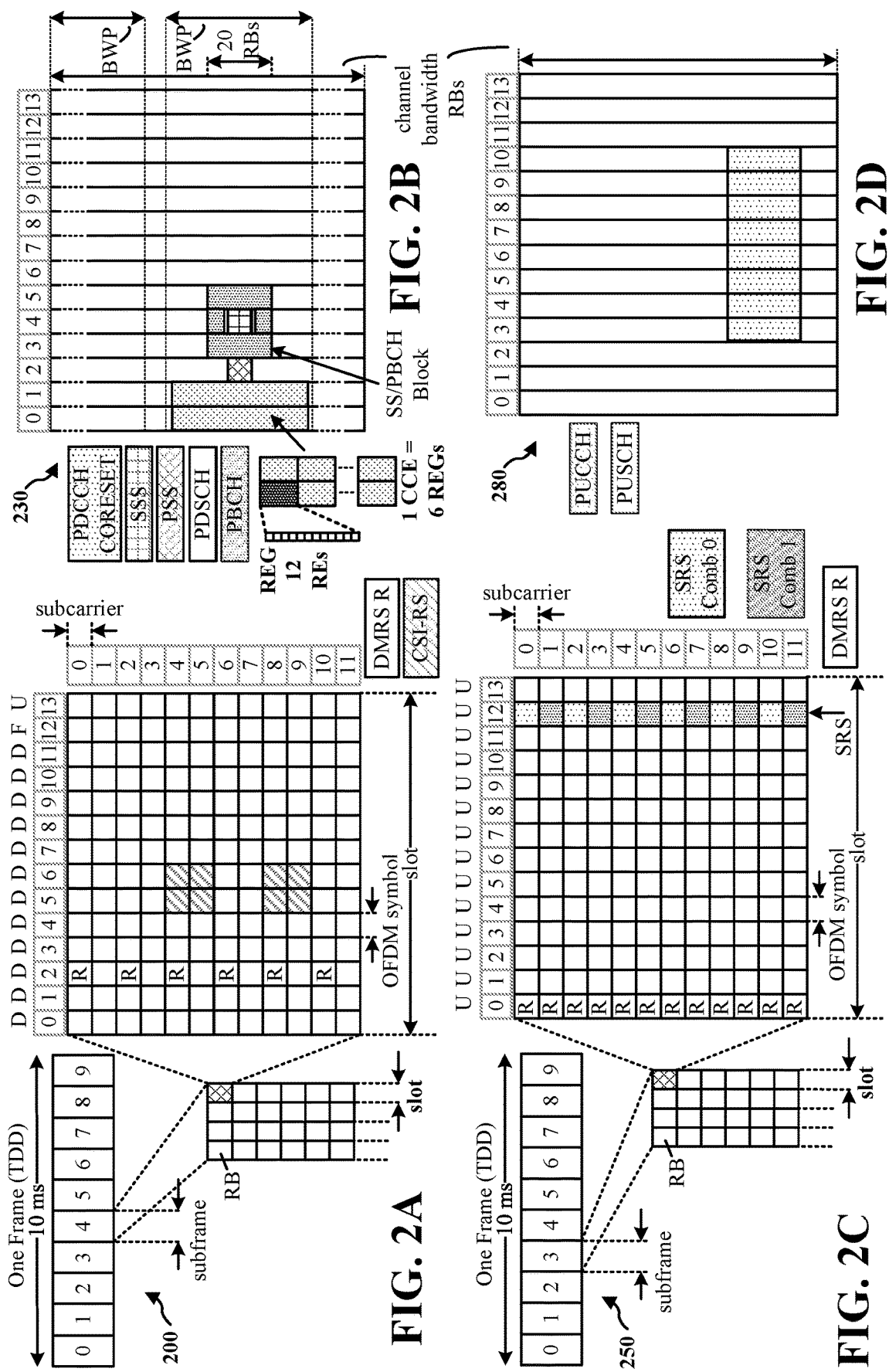
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
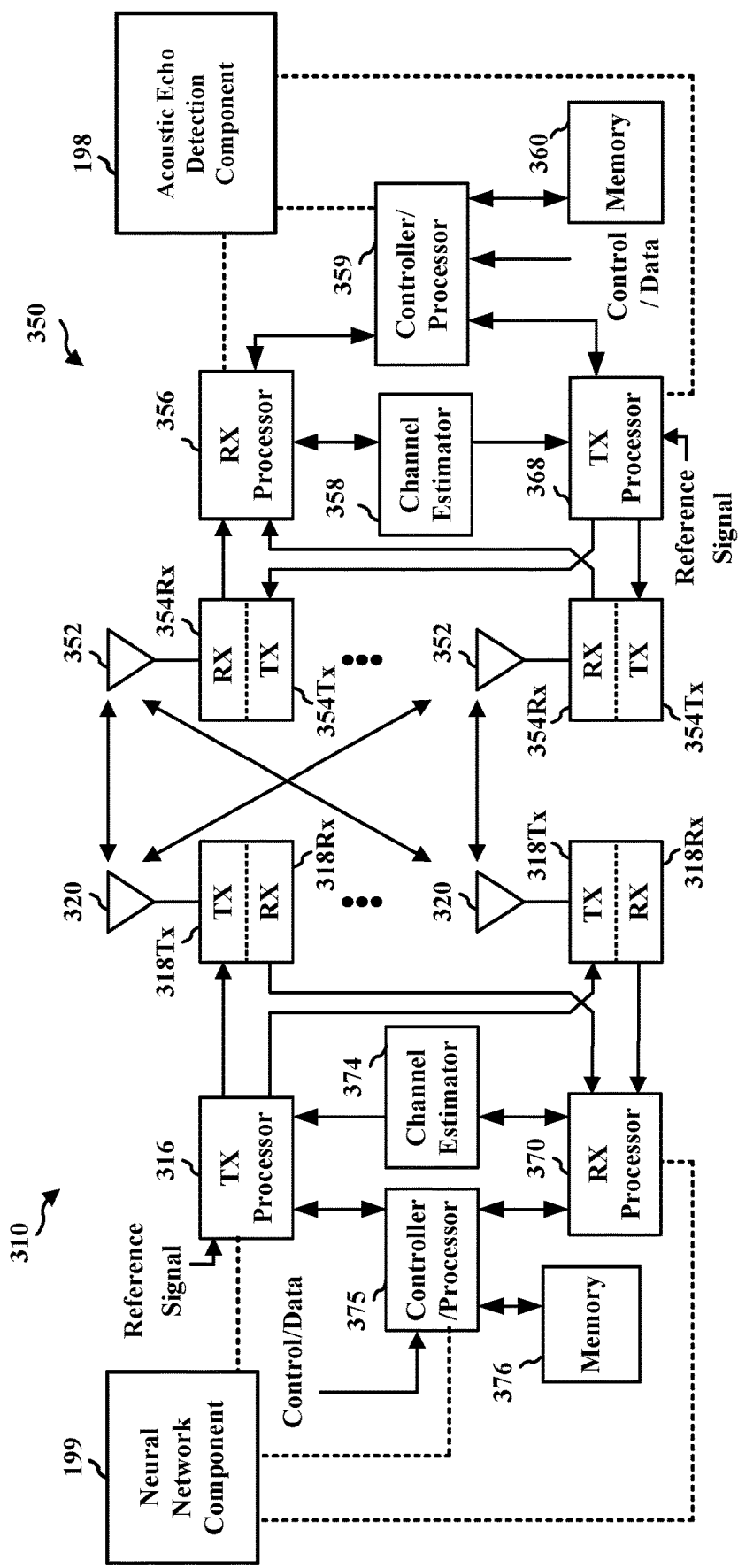
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the acoustic echo detection component 198 of FIG. 1.

At least one of the TX processor 316, the RX processor 370, and the controller/processor 375 may be configured to perform aspects in connection with the neuro network component 199 of FIG. 1.

Figure 4:
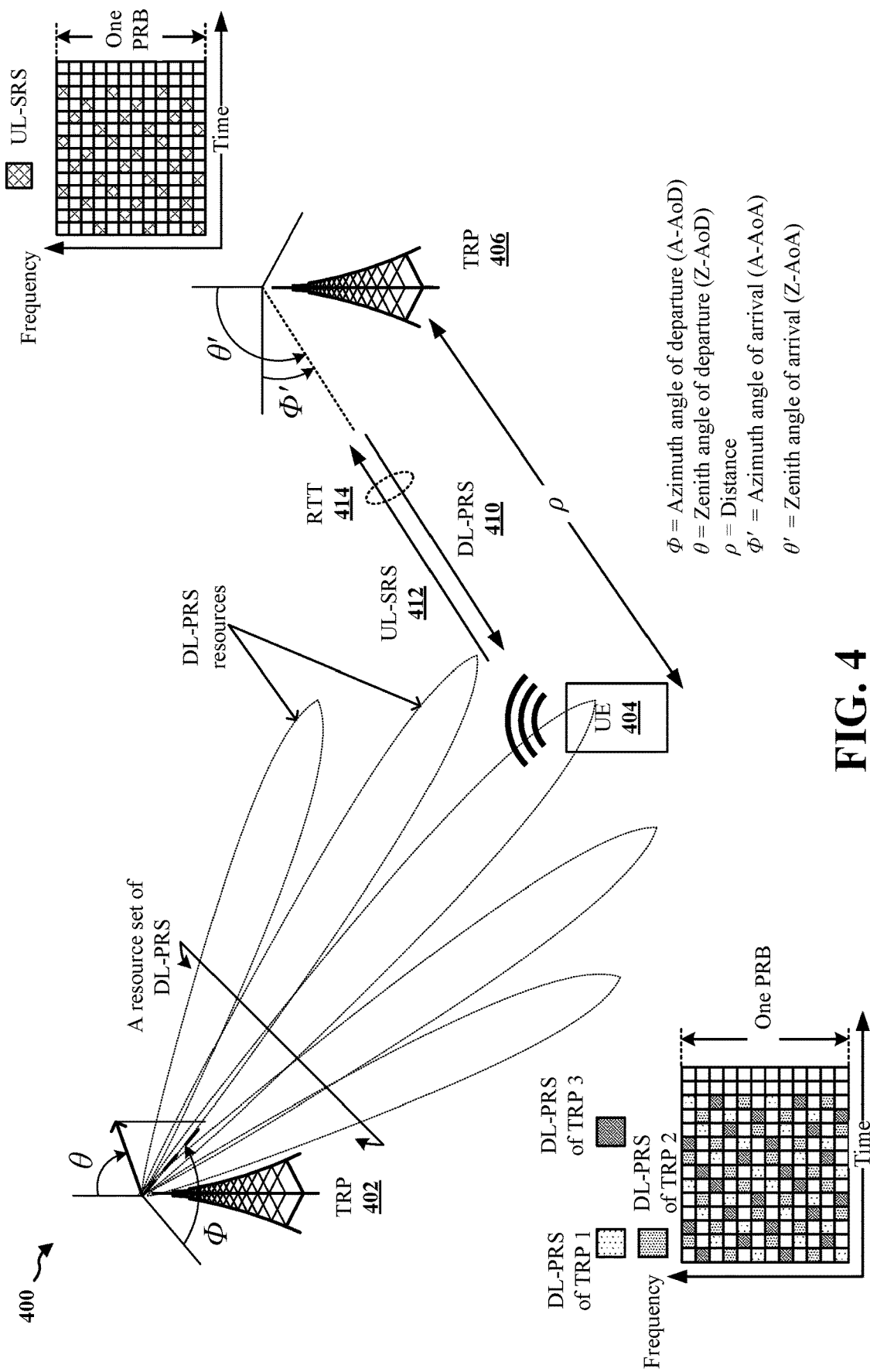
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure.

The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}\|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information. For example, some UE positioning mechanisms may be radio access technology (RAT)-dependent (e.g., the positioning of a UE is based on a RAT), such as the downlink positioning (e.g., measuring of observed time difference of arrival (OTDOA), the uplink positioning (e.g., measuring of uplink time difference of arrival (UTDOA), and/or the combined DL and UL based positioning (e.g., measuring of RTT with respect to neighboring cells), etc. Some wireless communications systems may also support Enhanced Cell-ID (E-CID) positioning procedures that are based on radio resource management (RRM) measurements. On the other hand, some UE positioning mechanisms may be RAT-independent (e.g., the positioning of a UE does not rely on a RAT), such as the enhanced GNSS, and/or positioning technologies based on WLAN, Bluetooth®, Terrestrial Beason System (TBS), and/or sensor based (e.g., barometric sensor, motion sensor), etc. Some UE positioning mechanisms may be based on a hybrid model, where multiple methods for positioning are used, which may include both RAT-dependent positioning technology and RAT-independent positioning technology (e.g., a GNSS with OTDOA hybrid positioning).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

While GNSS-based positioning and/or network-based positioning may provide accurate positioning, these positioning mechanisms may not work properly in GNSS disabled area (e.g., when GNSS signals are unavailable), out of network coverage area, and/or short distance area. As such, in some scenarios, local positioning systems may be more suitable for positioning compared to the GNSS/network-based positioning. A local positioning system may refer to a technology/mechanism used for estimating position(s)/range(s) of one or more objects in a short distance area or in a defined area (e.g., usually within few meters). For example, infrared (IR), laser, audio echo, and/or camera are some example technologies that may be used for performing short-range detections/recognitions. In some examples, devices that are used for performing short-range detections/recognitions may also be referred to as distance sensors, where they may detect distances of one or more objects by outputting a signal and measuring a change when the signal returns. The change measured may be in the form of: time it takes for a signal to return, intensity of a returned signal, and/or phase change of the returned signal, etc. However, certain distance sensors, such as camera or infrared, may not work properly under a very bright area or a low luminance area.

Acoustic echo detection, which may also be referred to as audio echo detection or ultrasonic sensing, is one of the most suitable mechanisms for detecting nearby/short distance objects with a high reliability. Acoustic echo detection (or an ultrasonic sensor) is capable of measuring the distance of an object using sound waves (e.g., ultrasonic pulses). For example, an acoustic echo detection system (e.g., an ultrasonic sensor) may include a transducer (e.g., an audio sound transducer) that acts as a speaker and is capable of transmitting a sound wave (typically at a frequency above the range of human hearing) and also as a microphone for receiving the sound wave reflected from a target. Then, the acoustic echo detection system may determine the distance to the target by measuring time lapses between the sending and receiving of the sound wave. However, the acoustic echo detection may have a limitation of detection range (fixed) and resolution (applicable to a predefined range).

Figure 5:
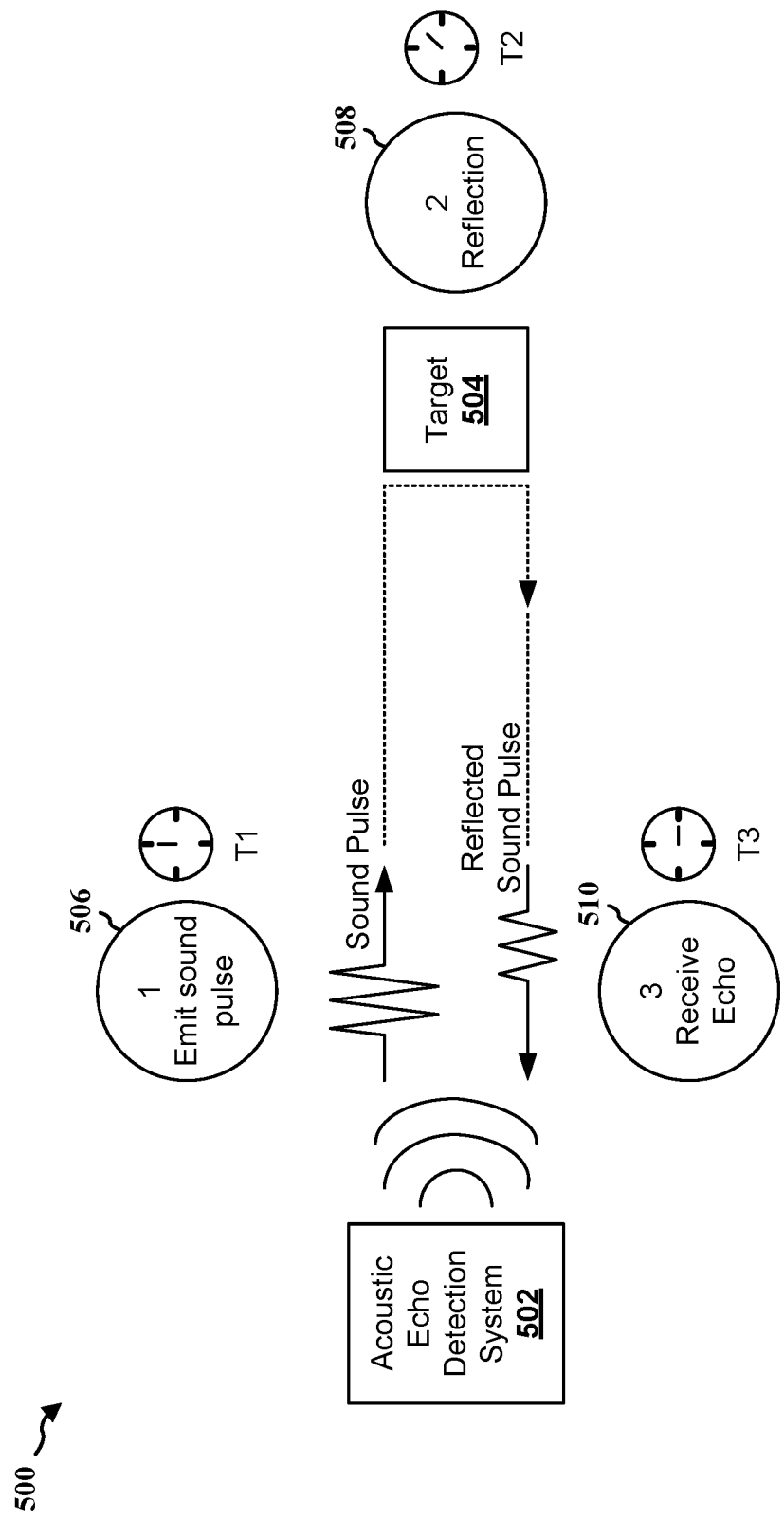
FIG. 5 is a diagram illustrating an example acoustic echo detection system in accordance with various aspects of the present disclosure.

FIG. 5 is a diagram 500 illustrating an example acoustic echo detection system in accordance with various aspects of the present disclosure. An acoustic echo detection system 502 may include at least one speaker and at least one microphone, where the speaker(s) may be used for transmitting sound waves/pulses, and the microphone(s) may be used for receiving the sound waves/pulses reflected from a target object (the reflected sound waves/pulses may be referred to as echoes).

For example, as shown at 506, the acoustic echo detection system 502 may transmit a sound pulse at a first point in time (T1). Then, as shown at 508, the transmitted sound pulse may reach a target 504 and reflect from the target 504 at a second point in time (T2). As shown at 510, at a third point in time (T3), the acoustic echo detection system 502 may receive the reflected sound pulse. Based on the time difference between the transmission of the sound pulse (e.g., T1) and the reception of the reflected sound pulse (e.g., T3), the acoustic echo detection system 502 may determine/estimate the distance between the acoustic echo detection system 502 and the target 504. In some examples, the transmitted sound pulse/wave may be referred to as a pilot tone, where the acoustic echo detection system 502 may specify a pilot tone injecting (e.g., transmission) and a pilot tone receiving to measure a time difference. For purposes of the present disclosure, the term "inject/injecting/injection" may be used interchangeably with the term "transmit/transmitting/transmission."

Sound frequencies between 20 kHz to 150 kHz may be widely used for a pilot tone (e.g., a sound wave/pulse) to avoid human interruption and to provide a more directional sound signal as this range of frequency is typically not hearable/audible by a human. However, the detectable range of an acoustic echo detection system may vary based on the frequency of the pilot tone it used. For example, while a high frequency pilot tone may provide higher accuracy (e.g., in terms of direction and/or object shape) compared to a low frequency pilot tone, the detection distance of a high frequency pilot tone may be short (e.g., approximately 2.5 meters for a 20 kHz pilot tone, and approximately 1.8 meters for a 40 kHz pilot tone). On the other hand, a low frequency pilot tone may have a wider transmission range and a longer detection distance compared to a high frequency pilot tone (e.g., approximately 3 meters for a 10 kHz pilot tone, approximately 3.5 meters for a 6 kHz pilot tone, and approximately 4.5 meters for a 1 kHz pilot tone). However, pilot tones with frequencies below 20 kHz may be heard by a human.

In one example, with an inaudible pilot tone of above 20 kHz, using a speaker array (e.g., a set of speakers) and a microphone array (e.g., a set of microphones) to beamform the pilot tone may increase the detection range of the acoustic echo detection system with high accuracy (e.g., greater than 95%) from 1 meter to a significant 2.5 meters. Also, using an audible pilot tone of 6 kHz may increase the corresponding range to 3.5 meters, which may be suitable for indoor (e.g., cross-the-room) uses. In some examples, at a distance of 3.5 meters, the 20 kHz pilot tone may have an accuracy of 96.8±2.2% at 2.5 m, while it may be 95.7±0.9% for the 6 kHz pilot tone.

Aspects presented herein may improve the accuracy and reliability of distance detection for one or more objects based on acoustic echo detection. Aspects presented herein provide an acoustic echo detection system (which may also be referred to as a wireless device or a user equipment (UE) in some examples) that is capable of dynamically changing the frequencies of its pilot tones (e.g., its transmitting sound signals) based on the distance of one or more objects detected, thereby enabling the acoustic echo detection system to utilize the advantages of both nonaudible frequency pilot tone (e.g., capable of detecting object(s) with higher accuracy) and audible frequency pilot tone (e.g., capable of travelling longer detection distances). In some examples, a non-audible frequency pilot tone may indicate a pilot tone with a frequency above 20 kHz, which may also be referred to as a "high frequency pilot tone" for purposes of the present disclosure, whereas an audible frequency pilot tone may indicate a pilot tone with a frequency between 20 Hz and 20 kHz, which may also be referred to as a "low frequency pilot tone" for purposes of the present disclosure. In other words, aspects presented herein may provide a dynamic pilot tone system that is capable of recognizing short distance, mid distance, and long distance by changing frequencies of the pilot tone.

For example, in one aspect of the present disclosure, an acoustic echo detection system with a plurality of speakers (e.g., two or more speakers) may be configured to perform dynamic pilot tone frequency change, where one speaker may initially be configured to inject (e.g., transmit) a lower (or a base) frequency pilot tone (e.g., below 10 kHz) for a wider and longer range detection, and other speaker(s) may be configured to inject a higher frequency pilot tone (e.g., above 20 kHz) for narrow and short-range detection when an object is detected. This may provide a more accurate distance detection of the object depending on the location of the object. For example, if an object is detected to be closing to a speaker injecting the lower frequency pilot tone (e.g., based on the received echoes), the frequency of the pilot tone injected by this speaker may be increased (e.g., to a high frequency pilot tone) and at least one other speaker that is transmitting the higher frequency pilot tone may switch to transmitting the lower (base) frequency pilot tone instead. In some examples, the change/swap of pilot tone frequencies (e.g., between higher frequencies and lower frequencies pilot tones) among the plurality of speakers may be determined using a recurrent neural network (RNN) model. For example, an RNN model may be trained to determine whether an object is approaching to or moving away from a speaker (or an acoustic echo detection system). In another aspect of the present disclosure, if the acoustic echo detection system is injecting pilot tones with audible frequencies (e.g., 50 Hz~15 kHz—ideally 0 kHz~20 kHz is audible sound but 99% of people may hear just 50 Hz~15 kHz) and a human is detected in proximity to the acoustic echo detection system, the acoustic echo detection system may be configured to transmit/inject an active noise control (ANC) signal toward the direction of the human to reduce/cancel the sound/noise associated with the audible pilot tones. ANC, which may also be known as noise cancellation (NC) or active noise reduction (ANR), is a mechanism for reducing unwanted sound by the addition of a second sound specifically designed to cancel the first.

Figure 6:
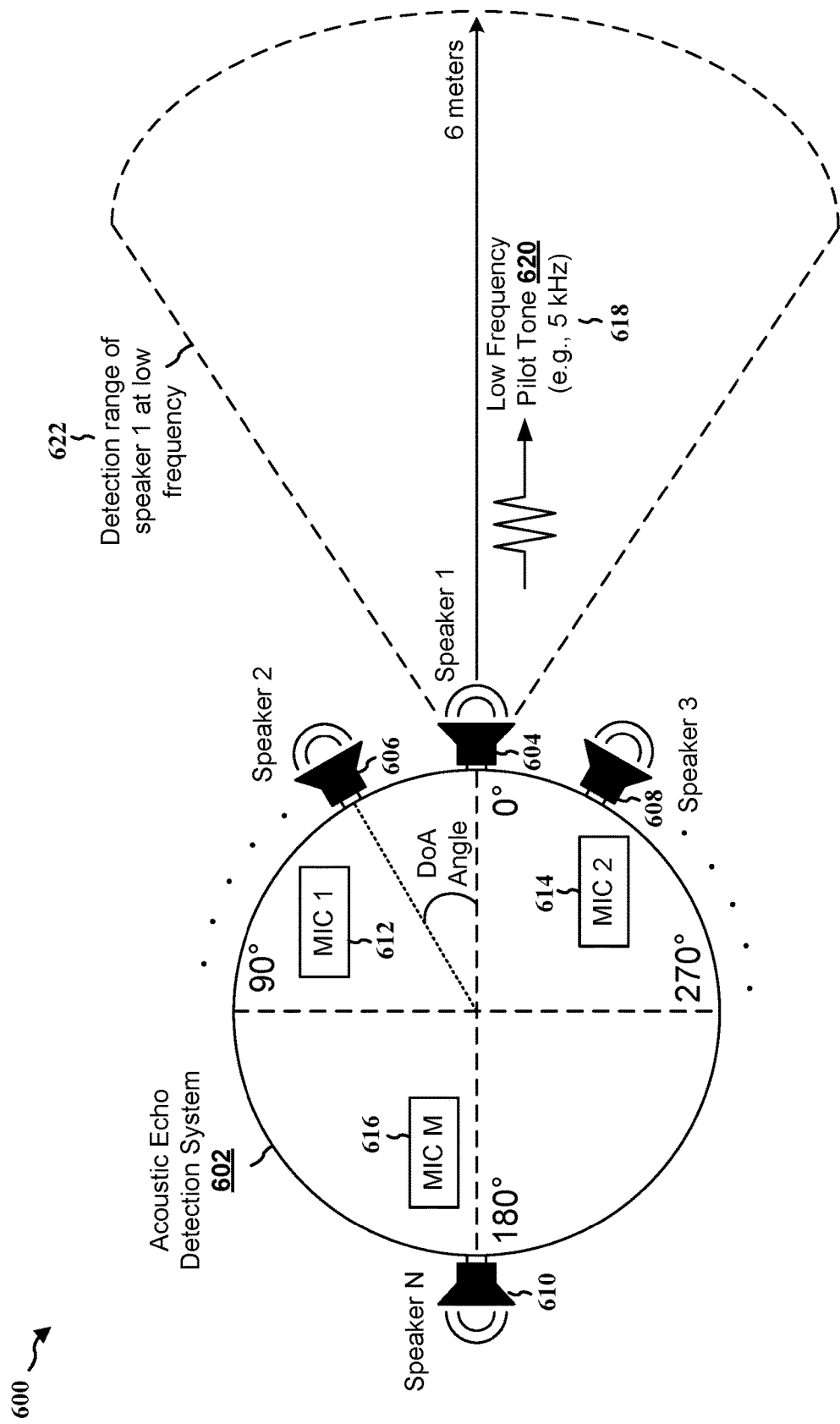
FIG. 6 is a diagram illustrating an example acoustic echo detection system with dynamic adjustment of pilot tones in accordance with various aspects of the present disclosure.
Figure 7:
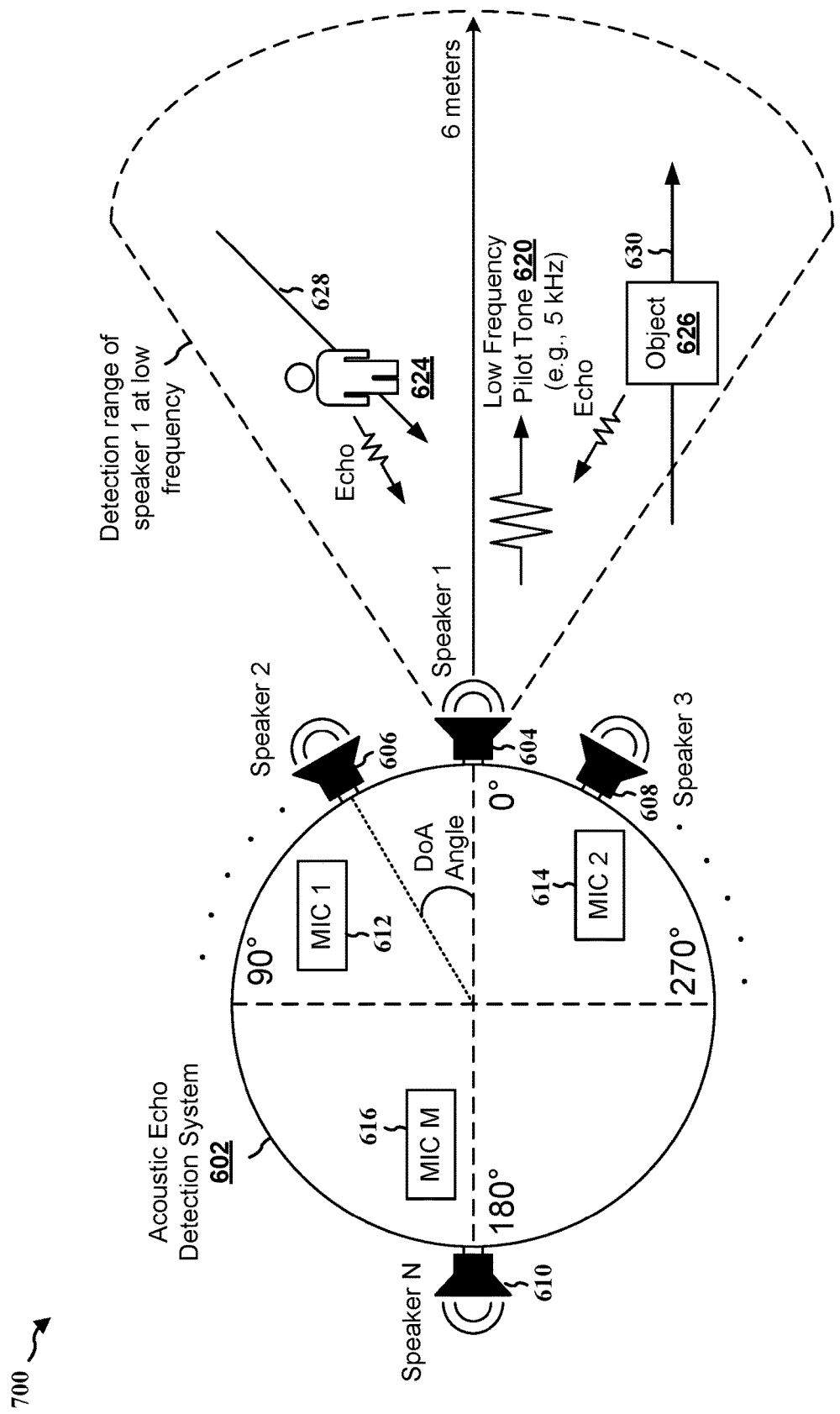
FIG. 7 is a diagram illustrating an example acoustic echo detection system with dynamic adjustment of pilot tones in accordance with various aspects of the present disclosure.
Figure 8:
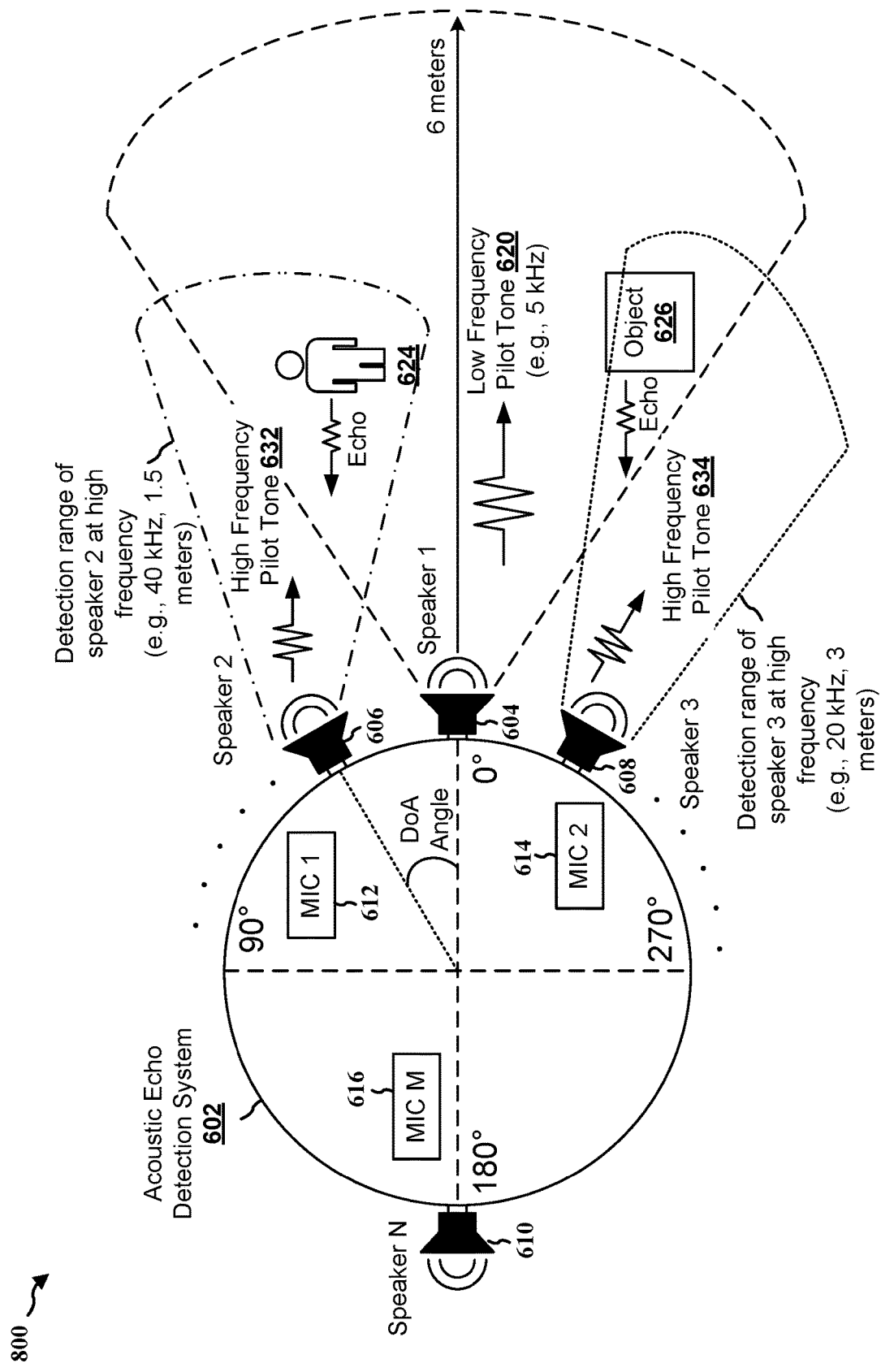
FIG. 8 is a diagram illustrating an example acoustic echo detection system with dynamic adjustment of pilot tones in accordance with various aspects of the present disclosure.

FIGS. 6, 7, and 8 are diagrams 600, 700, and 800, respectively, illustrating an example acoustic echo detection system with dynamic adjustment of pilot tones in accordance with various aspects of the present disclosure. An acoustic echo detection system 602 may include a set of speakers and a set of microphones that may be used for injecting (e.g., transmitting) pilot tones (e.g., sound waves/pulses) and receiving echoes (e.g., reflected sound waves/pulses). For purposes of illustration, the acoustic echo detection system 602 in the diagram 600 includes a first speaker 604 (speaker 1), a second speaker 606 (speaker 2), a third speaker 608 (speaker 3), and up to an $N^{th}$ speaker 610 (speaker N), and also includes a first microphone 612 (mic 1), a second microphone 614 (mic 2), and up to a $M^{th}$ microphone 616 (mic M). However, aspects presented herein may also apply to an acoustic echo detection system with one speaker and/or one microphone. In some implementations, the set of speakers may be configured to allocate evenly on the acoustic echo detection system 602 (e.g., the distance between two adjacent speakers may be the same) and/or toward different/multiple directions.

As shown at 618, the first speaker 604 may initially be configured to inject a low frequency pilot tone 618 (e.g., 1 kHz, 5 kHz, 10 kHz, etc.) that is capable of covering a wider range and a longer detection distance (compared to a higher frequency pilot tone), such as shown at 622. For example, if a 5 kHz pilot tone is used, the detection range may be up to 6 meters. In some examples, more than one speaker may be configured to inject the low frequency pilot tone 618 initially. For example, the second speaker 606 and the third speaker 608 may also be configured to inject the low frequency pilot tone 618, or as an alternative, they may be configured not to transmit any pilot tone initially (or by default).

In one example, as shown by the diagram 700 of FIG. 7 at 628 and 630, if a person 624 and an object 626 move to the detection range of the acoustic echo detection system 602 (or the first speaker 604), the acoustic echo detection system 602 may be able to detect the person 624 and the object 626 based on the echoes of the low frequency pilot tone 620 (e.g., reflected from the person 624 and the object 626 and received by one of the microphones. The acoustic echo detection system 602 may also calculate the distance of the person 624 and/or the distance of the object 626 based on the echoes of the low frequency pilot tone 620, such as described in connection with FIG. 5.

As shown by the diagram 800 of FIG. 8, after the acoustic echo detection system 602 detects the person 624 and/or the object 626, the acoustic echo detection system 602 may configure the second speaker 606 to inject a high frequency pilot tone 632 (e.g., a 40 kHz pilot tone with a detection range of approximately 1.5 meters) and the third speaker 608 to inject another high frequency pilot tone 634 (e.g., a 20 kHz pilot tone with a detection range of approximately 3 meters). The high frequency pilot tone 632 and the high frequency pilot tone 634 may have the same frequency or different frequencies depending on one or more conditions. For example, the frequency to be used by the second speaker 606 or the third speaker 608 may depend on the estimated distance(s) of the object(s) detected, e.g., if the acoustic echo detection system 602 detects that the person 624 is approximately 1.5 meters away from it, the acoustic echo detection system 602 may configure the second speaker 606 to inject a pilot tone with a detection range above at least 1.5 meters (e.g., pilot tones with frequencies below 40 kHz). Similarly, if the acoustic echo detection system 602 detects that the object 626 is approximately 3 meters away from it, the acoustic echo detection system 602 may configure the third speaker 608 to inject a pilot tone with a detection range above at least 3 meters (e.g., pilot tones with frequencies below 20 kHz). Thus, one or more speakers of the acoustic echo detection system 602 may dynamically inject high frequency pilot tones depending on the object distance while the first speaker 604 continue to inject the low frequency pilot tone 620 to cover a wide range of area and longer detection distance. Then, the acoustic echo detection system 602 may calculate the distance of the person 624 and/or the distance of the object 626 further based on the echoes of the high frequency pilot tones 632 and/or 634, such as described in connection with FIG. 5.

Although pilot tones with higher frequencies (e.g., the high frequency pilot tones 632 and 634) may have a shorter detection distances, they also tend to provide and show more directional characteristic and higher resolution of the detected object(s) compared to pilot tones with lower frequencies (e.g., the low frequency pilot tone 620). As such, by enabling the acoustic echo detection system 602 to inject pilot tones of different frequencies (e.g., both high and low frequencies) via different speakers dynamically, the acoustic echo detection system 602 may be able to cover different detection ranges without impacting the accuracy and reliability of the object/distance detection (e.g., without the trade-off between using either the high frequency pilot tone or the low frequency pilot tone). In some examples, if the person 624 and/or the object 626 are no longer within the detection range of the acoustic echo detection system 602, the acoustic echo detection system 602 may stop transmitting the high frequency pilot tones 632 and/or 634.

In another example, as shown by FIGS. 6 to 8, the acoustic echo detection system 602 may be configured/designed to include multiple speakers that are facing multiple/different directions, thereby enabling the acoustic echo detection system 602 to transmit pilot tones to cover a wider range of areas. For example, the acoustic echo detection system 602 may be a circular-shape device with speakers facing at different angles (with respect to the center). Similarly, the acoustic echo detection system 602 may also include multiple microphones that are placed at different locations or facing different directions for capturing the reflected pilot tones from a wider range of areas. In some examples, the acoustic echo detection system 602 may be configured to rotate the injection of the low frequency pilot tone via different speakers, such as when no object is being detected within a specified period of time. For example, if the acoustic echo detection system 602 is initially injecting the low frequency pilot tone 620 from the first speaker 604 but does not detect any objects within 10 seconds, the acoustic echo detection system 602 may rotate the injection of the low frequency pilot tone 620 to the second speaker 606. Similarly, if the acoustic echo detection system 602 does not detect any objects within another 10 seconds, the acoustic echo detection system 602 may rotate the injection of the low frequency pilot tone 620 to the third speaker 608 and so on. As such, the acoustic echo detection system 602 may rotate the origin of the pilot tone periodically (e.g., from different speakers) to cover a larger angle area (e.g., 360 degrees).

In another aspect of the present disclosure, to reduce the power consumption of an acoustic echo detection system (e.g., the acoustic echo detection system 602), the acoustic echo detection system may adjust the periodicity of pilot tone injections dynamically based on whether an object is detected.

Figure 9:
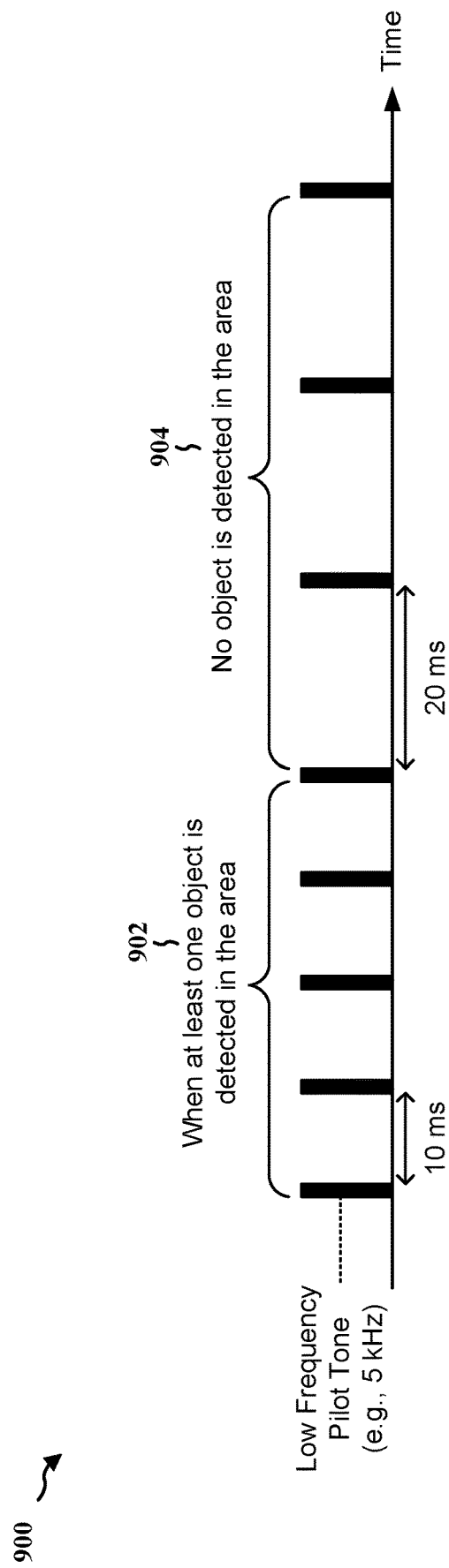
FIG. 9 is a diagram illustrating an example of adjusting the periodicity of a pilot tone in accordance with various aspects of the present disclosure.

FIG. 9 is a diagram 900 illustrating an example of adjusting the periodicity of a pilot tone in accordance with various aspects of the present disclosure. In one example, as shown at 902, when an acoustic echo detection system detects an object within its detection range (e.g., as shown by the diagram 700 of FIG. 7), the acoustic echo detection system may transmit its pilot tones (e.g., the low/base frequency pilot tone) with a shorter periodicity (e.g., 10 microseconds (ms) per pilot tone injection). However, as shown at 904, if the acoustic echo detection system does not detect any object within its detection range (e.g., for a period of time), the acoustic echo detection system may transmit the pilot tones with a longer periodicity (e.g., 20 microseconds (ms) per pilot tone injection). In some example, a minimum periodicity for injecting a pilot tone may also be defined for the acoustic echo detection system to enable the acoustic echo detection system to have sufficient time to receive a reflected pilot tone. For example, if it takes a maximum of X ms for a pilot tone to reach a target that is at a maximum detection range (e.g., 6 meters) and reflect from the target (e.g., 12 meters in total), the acoustic echo detection system may be configured to transmit the pilot tone with a minimum periodicity above X ms.

In another example, to reduce power consumption, the acoustic echo detection system may also vary its output power (e.g., for injecting pilot tone(s)) based on whether an object is detected. For example, the acoustic echo detection system may increase its output power for transmitting the low frequency pilot tone when at least one object is detected within its detection range, and the acoustic echo detection system may reduce its output power for transmitting the low frequency pilot tone (or return to a default output power) when no object is detected within its detection range (for a specified period of time).

Similarly, to ensure multiple pilot tones reflected from one or more object are properly received by the microphone(s) of an acoustic echo detection system (e.g., the acoustic echo detection system 602), the acoustic echo detection system may also adjust the periodicity of pilot tone injections dynamically based on the number of pilot tones used.

Figure 10:
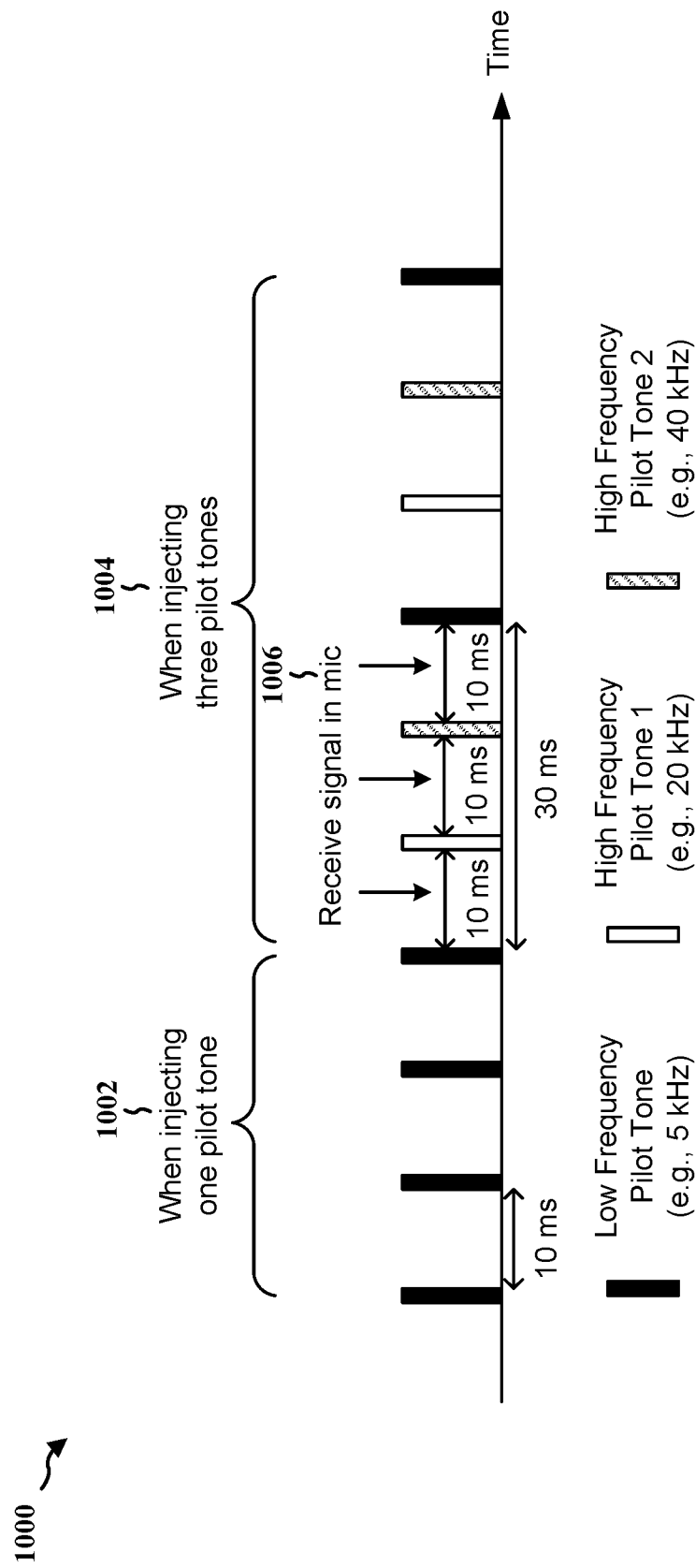
FIG. 10 is a diagram illustrating an example of adjusting the periodicity of pilot tone(s) in accordance with various aspects of the present disclosure.

FIG. 10 is a diagram 1000 illustrating an example of adjusting the periodicity of pilot tone(s) in accordance with various aspects of the present disclosure. In one example, as shown at 1002, an acoustic echo detection system may be configured to transmit a low/base frequency pilot tone (e.g., a 5 kHz pilot tone) with a shorter periodicity (e.g., 10 ms) when the acoustic echo detection system is just injecting the low/base frequency pilot tone (e.g., transmitting one pilot tone). However, as shown at 1004, when the acoustic echo detection system is configured to transmit three pilot tones (e.g., with additional first high frequency pilot tone and second high frequency pilot tone), such as in response to detecting an object as described in connection with FIG. 8, the acoustic echo detection system may transmit the low/base frequency pilot tone with a longer periodicity (e.g., 30 ms) to provide sufficient time for different pilot tones to be transmitted and received by the acoustic echo detection system. For example, as shown at 1006, the low frequency pilot tone, the first high frequency pilot tone, and the second high frequency pilot tone may be configured to be injected 10 ms apart, thereby enabling each pilot tone to have sufficient time to reach a target, reflect from the target, and receive by the acoustic echo detection system. Such configuration may also prevent the acoustic echo detection system from transmitting and/or receiving pilot tones simultaneously, which may affect the accuracy and reliability of object detection.

In another aspect of the present disclosure, to further improve the accuracy and reliability of an acoustic echo detection system with dynamic pilot tones, the acoustic echo detection system may adjust the frequency of pilot tones transmitted from each speaker of the acoustic echo detection system based on the position and/or the movement of a target object.

Figure 11:
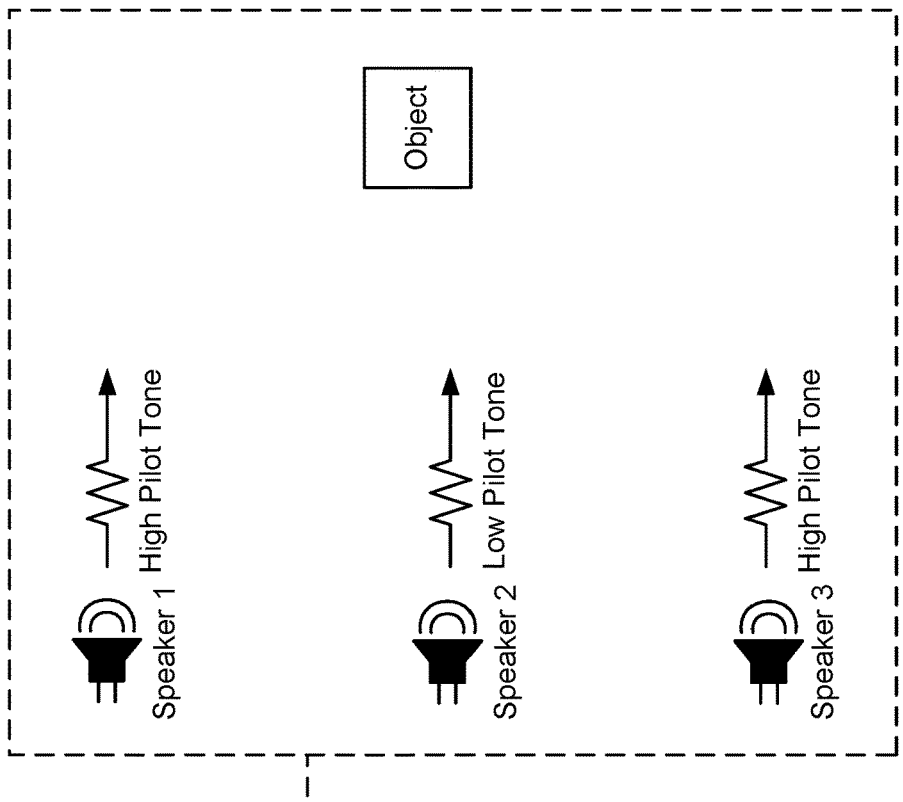
FIG. 11 is a diagram illustrating an example of an acoustic echo detection system adjusting/swapping the pilot tone frequencies among multiple speakers based on the position and/or the movement of a target object in accordance with various aspects of the present disclosure.
Figure 12:
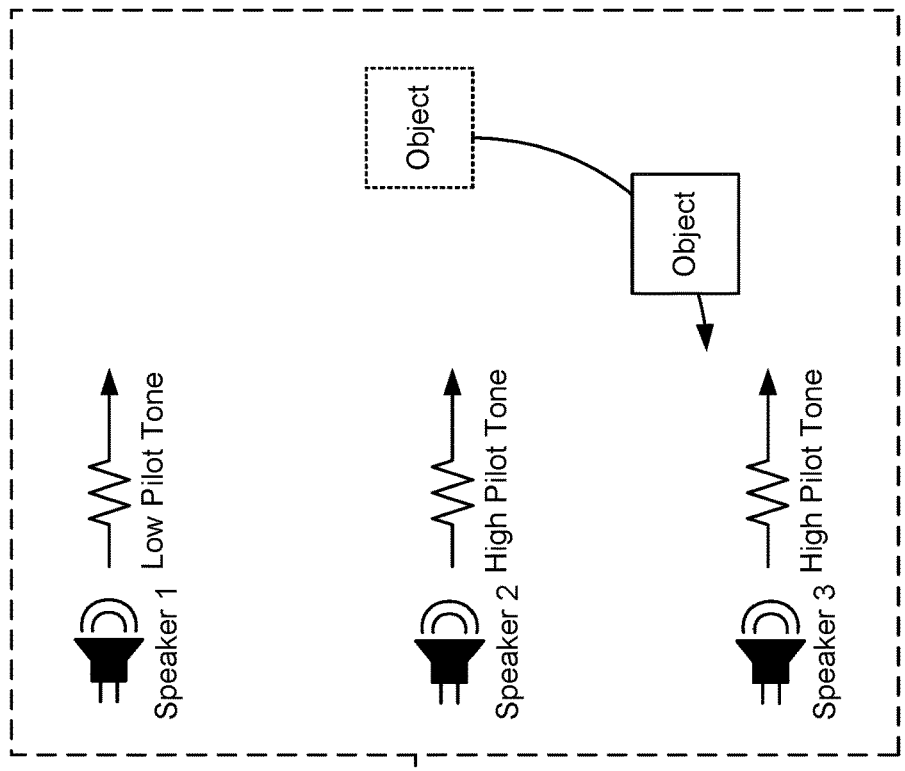
FIG. 12 is a diagram illustrating an example of an acoustic echo detection system adjusting/swapping the pilot tone frequencies among multiple speakers based on the position and/or the movement of a target object in accordance with various aspects of the present disclosure.
Figure 13:
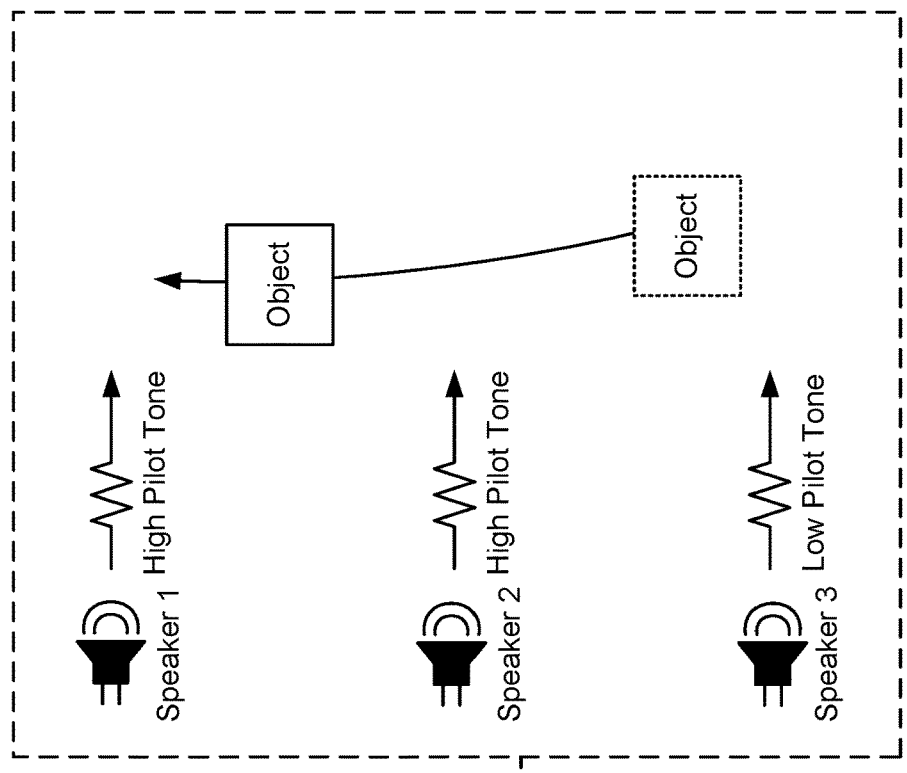
FIG. 13 is a diagram illustrating an example of an acoustic echo detection system adjusting/swapping the pilot tone frequencies among multiple speakers based on the position and/or the movement of a target object in accordance with various aspects of the present disclosure.

FIGS. 11, 12, and 13 are diagrams 1100, 1200, and 1300, respectively, illustrating an example of an acoustic echo detection system adjusting/swapping the pilot tone frequencies among multiple speakers based on the position and/or the movement of a target object in accordance with various aspects of the present disclosure. In one example, as shown by the diagram 1100 of FIG. 11, by a default setting or in response to a target object being detected within its detection range (e.g., as described in connection with FIG. 8), an acoustic echo detection system (e.g., the acoustic echo detection system 602) may inject a low frequency pilot tone (e.g., the low frequency pilot tone 620) via a second speaker (speaker 2) and inject a high frequency pilot tone (e.g., the high frequency pilot tone 632, 634) via a first speaker (speaker 1) and a third speaker (speaker 3).

As shown by the diagram 1200 of FIG. 12, when the acoustic echo detection system detects that the target object is moving toward the second speaker and the third speaker (and/or away from the first speaker), the acoustic echo detection system may configure the first speaker to inject the low frequency pilot tone, and configure the second speaker and the third speaker to inject the high frequency pilot tone. This may enable the acoustic echo detection system to inject high frequency pilot tones from speaker(s) closer to the target object, thereby improving the accuracy and/or the reliability of estimating the distance of the target object from the acoustic echo detection system. Similarly, as shown by the diagram 1300 of FIG. 13, if the acoustic echo detection system detects that the target object is now moving towards the first speaker and the second speaker (and/or away from the third speaker), the acoustic echo detection system may configure the first speaker and the second speaker to inject the high frequency pilot tone, and configure the third speaker to inject the low frequency pilot tone instead.

Figure 14:
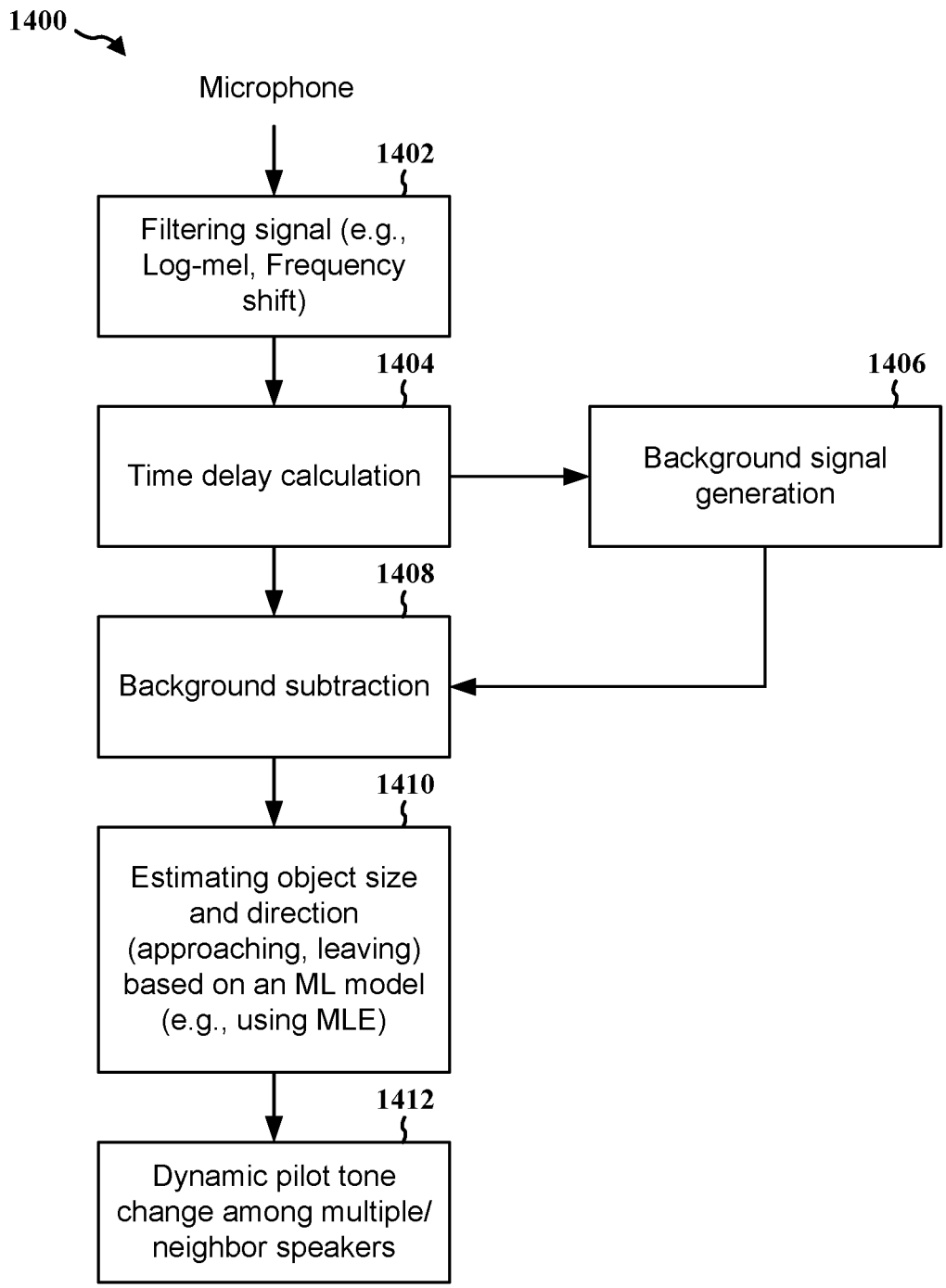
FIG. 14 is a flowchart illustrating an example of an acoustic echo detection system dynamically change frequencies of pilot tones among multiple speakers based on the position and/or the movement of a target object in accordance with various aspects of the present disclosure.

FIG. 14 is a flowchart 1400 illustrating an example of an acoustic echo detection system dynamically change frequencies of pilot tones among multiple speakers based on the position and/or the movement of a target object in accordance with various aspects of the present disclosure. An acoustic echo detection system may transmit pilot tone(s) via a set of speakers, such as described in connection with FIGS. 6 to 8. Then, the acoustic echo detection system may receive the reflection of the pilot tone(s) via at least one microphone.

At 1402, after receiving the reflected pilot tone(s), the acoustic echo detection system may filter the reflected pilot tone(s), such as using a frequency shift filter or a log-mel filter.

At 1404, the acoustic echo detection system may calculate the time delay of the transmitted pilot tones, such as the time between the pilot tone(s) are transmitted and the time the reflected pilot tone(s) are received by the acoustic echo detection system.

At 1406 and 1408, the acoustic echo detection system may generate a set of background signals, and the acoustic echo detection system may subtract background signals of the reflected pilot tone(s) based on the set of generated background signals.

At 1410, the acoustic echo detection system may estimate the size and/or the direction (e.g., approaching, moving away, etc.) of an object detected, such as based on a machine learning (ML) model using maximum likelihood estimation (MLE). MLE may refer to a method of estimating the parameters of an assumed probability distribution, given some observed data. This is achieved by maximizing a likelihood function so that, under an assumed statistical model, the observed data is most probable.

At 1412, based on the estimated size and/or the moving direction of the object detected, the acoustic echo detection system may dynamically adjust frequencies of pilot tones injected from its speakers, such as described in connection with FIGS. 11 to 13. For example, if the acoustic echo detection system detects that the object is moving toward its left side, the acoustic echo detection system may configure speaker(s) on its left side to transmit high frequency pilot tones and speaker(s) on its right side to transmit low frequency pilot tones.

In some implementations, an acoustic echo detection system may have the capability to classify/recognize the object's approaching to or leaving from the speaker using a set of specified input features and a neural network (NN).

Figure 15:
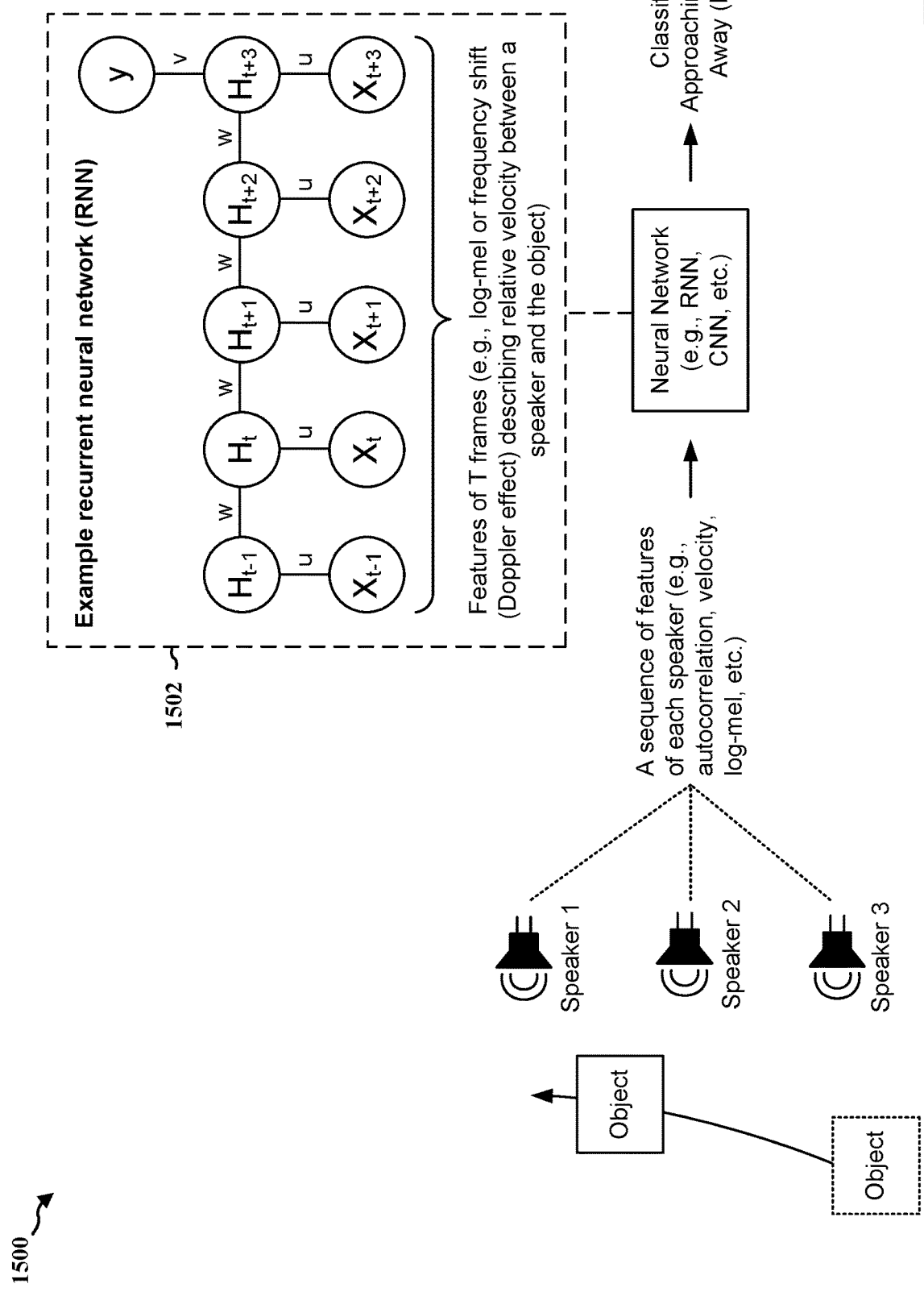
FIG. 15 is a diagram illustrating an example of using a neural network to determine whether an object is approaching or moving away from a speaker (or an acoustic echo detection system) in accordance with various aspects of the present disclosure.

FIG. 15 is a diagram 1500 illustrating an example of using a neural network to determine whether an object is approaching or moving away from a speaker (or an acoustic echo detection system) in accordance with various aspects of the present disclosure. In one example, a neural network (e.g., a recurrent neural network (RNN), a convolutional neural network (CNN), etc.) may receive a sequence of features of each speaker in a set of speakers (e.g., speakers 1 to 3), where the sequence of features may be associated with an object being detected and/or the corresponding speaker. For example, the features may include an autocorrelation, velocity, frequency shift, an amplitude shift (or amplitude degradation), log-mel coefficients, and/or mel-frequency cepstral coefficients associated with a speaker and the object. Then, based on the sequence of features received, the neural network may classify the movement of the object, such as whether the object is approaching or moving away from a specified speaker (or the acoustic echo detection system).

For example, as shown at 1502, an RNN may be used for classifying the movement of the object given a sequence of features of T frames, where the features may be log-mel or frequency shift (Doppler effect) describing relative velocity between a corresponding speaker and the object detected. Then, based on the sequence of features, the RNN may generate an output y (which may also be referred to as an inference) that is a single node: $y \in [0, 1]$. In one example, the higher value may indicate a higher probability of the object approaching to the speaker. Then, the frequency of pilot tone (from a speaker) may be determined based on the confidence value of the output node, e.g., $f_{pilot} = (f_{max} - f_{min})y + f_{min}$, where $f_{max}$ and $f_{min}$ may indicate the maximum and minimum pilot tone frequencies, respectively, that are predefined.

In another aspect of the present disclosure, to avoid or reduce interference to humans when an acoustic echo detection system is injecting pilot tones with audible frequencies (e.g., 0-20 kHz), the acoustic echo detection system may be configured to transmit active noise control (ANC) signals, which may be in response to a human being detected (e.g., by the acoustic echo detection system) or when an audible frequency is used for a pilot tone.

Figure 16:
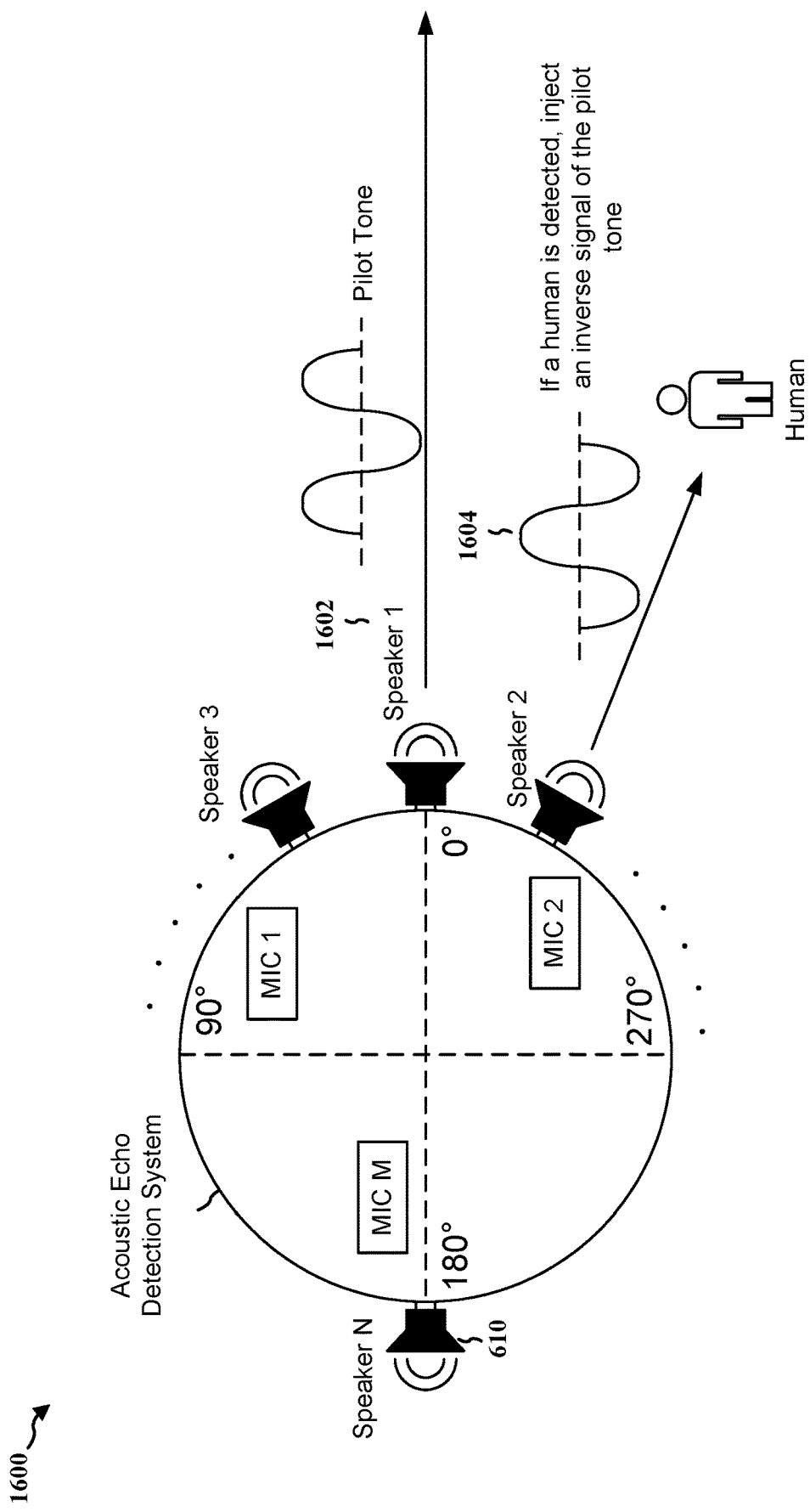
FIG. 16 is a diagram illustrating an example of an acoustic echo detection system injecting active noise control (ANC) signals in accordance with various aspects of the present disclosure.

FIG. 16 is a diagram 1600 illustrating an example of an acoustic echo detection system injecting ANC signals in accordance with various aspects of the present disclosure. As shown at 1602, an acoustic echo detection system (e.g., the acoustic echo detection system 602) may be injecting a pilot tone with an audible frequency (e.g., 0-20 kHz) via one of its speakers (e.g., speaker 1). Then, as shown at 1604, if a human is detected by the acoustic echo detection system (or if an audible frequency is used for a pilot tone), the acoustic echo detection system may inject an ANC signal (e.g., an inverse signal of the pilot tone) to eliminate or reduce the sound/noise associated with the pilot tone.

In some examples, the acoustic echo detection system may be able to identify the identity of an object (e.g., a human, an animal, etc.) from a reflected pilot tone based on using an ML model, such as an ML model that is capable of performing source separation. Source separation, which may also be referred to as blind signal separation (BSS) or blind source separation, is the separation of a set of source signals from a set of mixed signals, without the aid of information (or with very little information) about the source signals or the mixing process. It may involve the analysis of mixtures of signals, where the objective is to recover the original component signals from a mixture signal. For the present disclosure, since reflected signals (e.g., echoes) may be deterministic and known prior, mask-vectors or mask-matrix per source may be generated prior and hence source separation may be done with one-stage NN or ML method. In another example, using an ML/model or a NN to perform source separation may also enable the acoustic echo detection system to inject two or more pilot tones without configuring gaps between pilot tones transmitted from different speakers (e.g., as described in connection with FIG. 10) since the acoustic echo detection system may be able to distinguish the reflected pilot tones from different speakers and frequencies). In other words, the acoustic echo detection system may transmit multiple pilot tones of different frequencies from different speakers simultaneously. Thus, the acoustic echo detection system may be capable of performing a quicker scan (e.g., object detection) and/or having a faster response time for relatively faster moving objects, etc.

Aspects presented herein may be suitable for devices (e.g., Internet of Things (IOT) devices, robots, automobiles, etc.) that specify high accuracy distance measurement in a short-range. While laser, camera, and infrared may be alternative methods for distance measurement, they may not work properly in a strong light or dark environment, or may not have the capability to provide a wide range and/or short distance detection. As such acoustic echo detection may be a good approach for the short-range detection as it is capable of providing accurate and reliable distance measurement. As a fixed frequency ultrasound approach has a limitation of fixed range detection, it is incapable of capturing objects that are out of the fixed range and its detection accuracy may be guaranteed in for a defined range. Thus, the acoustic echo detection system with dynamic pilot tone described in herein may provide a dynamic distance control with a high detection accuracy. In some examples, as shown by FIGS. 6 to 8, the speakers of an acoustic echo detection system may be configured to inject pilot tones toward different directions. For example, the acoustic echo detection system 602 may include N speakers and M microphones that cover 360 directions.

FIG. 17 is a flowchart 1700 of a method of wireless communication. The method may be performed by a wireless device (e.g., the UE 104, 404; the acoustic echo detection system 502, 602; the apparatus 1904). The method may enable the wireless device to dynamically change the frequencies of its pilot tones based on the distance of one or more objects detected, thereby enabling the wireless device to utilize the advantages of both high frequency pilot tone and low frequency pilot tone.

At 1702, the wireless device may transmit a first pilot tone at a first frequency, such as described in connection with FIGS. 6-8. For example, as shown by FIG. 6, the acoustic echo detection system 602 may inject (e.g., transmit) a low frequency pilot tone 620 from the first speaker 604. The means for transmitting the first pilot tone may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

At 1704, the wireless device may detect whether there is an object within a specified distance of the wireless device based on a reflected signal of the first pilot tone, such as described in connection with FIGS. 6-8. For example, as shown by FIG. 7, the acoustic echo detection system 602 may detect a person 624 and object 626 that is within its detection distance (e.g., 6 meters) based on the echoes of the low frequency pilot tone 620 (e.g., reflected from the person 624 and the object 626). The means for detecting whether there is an object within a specified distance may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

In one example, to detect whether there is the object within the specified distance based on the first pilot tone, the wireless device may receive the reflected signal of the first pilot tone from the at least one object, calculate a distance of the at least one object with respect to the wireless device based the reflected signal of the first pilot tone, and determine that the at least one object is within the specified distance if the calculated distance is within the specified distance.

In another example, to detect whether there is the object within the specified distance of the wireless device based on the reflected signal of the first pilot tone, the wireless device may identify that the reflected signal is associated with the object based on source separation. In some implementations, the reflected signal may be identified as being associated with the object based on source separation.

At 1706, the wireless device may transmit a second pilot tone at a second frequency based on at least one object being detected within the specified distance, where the second frequency is higher than the first frequency, such as described in connection with FIGS. 6-8. For example, as shown by FIG. 8, in response to the person 624 and/or the object 626 being detected, acoustic echo detection system 602 may transmit a higher frequency pilot tone 632 and/or a higher frequency pilot tone 634. The means for transmitting the second pilot tone may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

In one example, the wireless device may estimate at least one of a size, a direction, or a distance of the at least one object based on a machine learning model, and the wireless device may transmit the second pilot tone further based on the size, the direction, the distance, or combinations thereof of the at least one object. In some implementations, the direction of the at least one object may be indicative of whether the at least one object is approaching or moving away from the wireless device.

At 1708, the wireless device may calculate a first distance of the at least one object with respect to the wireless device based the second pilot tone, such as described in connection with FIGS. 6-8. For example, as shown by FIG. 8, the acoustic echo detection system 602 may calculate the distance of the person 624 and/or the distance of the object 626 further based on the echoes of the high frequency pilot tones 632 and/or 634. The means for calculating the first distance of the at least one object may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

In one example, the wireless device may transmit a third pilot tone at a third frequency based on the at least one object being detected within the specified distance, where the third frequency may be higher than the first frequency and different from the second frequency, and the wireless device may calculate a second distance of the at least one object with respect to the wireless device based the third pilot tone. In some implementations, the first pilot tone may be transmitted via a first speaker, the second pilot tone may be transmitted via a second speaker, and the third pilot tone may be transmitted via a third speaker.

At 1710, the wireless device may stop transmitting the second pilot tone based on the at least one object being no longer within the specified distance, such as described in connection with FIGS. 6-8. For example, as shown by FIG. 8, if the person 624 and/or the object 626 are no longer within the detection range of the acoustic echo detection system 602, the acoustic echo detection system 602 may stop transmitting the high frequency pilot tones 632 and/or 634. The means for stopping transmitting the second pilot tone may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

At 1712, the wireless device may detect the at least one object includes a human, and the wireless device may inject an inverse signal of the first pilot tone, such as described in connection with FIG. 16. For example, as shown at 1604 of FIG. 16, an acoustic echo detection system may inject inverse signal of the pilot tone if a human is detected. The means for detecting the at least one object includes a human and/or the means for injecting the inverse signal of the first pilot tone may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

At 1714, the wireless device may transmit the first pilot tone with a longer periodicity if no object is detected within the specified distance of the wireless device in a specified time period, such as described in connection with FIG. 9. For example, as shown at 904 of FIG. 9, the acoustic echo detection system 602 may transmit the low frequency pilot tone with a longer periodicity if no object is detected in the area. The means for transmitting the first pilot tone with a longer periodicity may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

In one example, the wireless device may transmit the second pilot tone with a shorter periodicity if the at least one object is detected within a second specified distance of the wireless device.

In another example, the first pilot tone may be initially transmitted via a first speaker and the second pilot tone may be initially transmitted via a second speaker. The wireless device may detect that the at least one object is approaching the first speaker, and the wireless device may switch transmission of the first pilot tone to the second speaker and transmission of the second pilot tone to the first speaker based on the at least one object approaching the first speaker. In some implementations, to detect that the at least one object is moving toward the first speaker, the wireless device may transmit, to a neural network, a set of features associated with the at least one object, the first speaker, the second speaker, or a combination thereof. Then, the wireless device may receive, from the neural network, an indication or an inference that the at least one object is approaching the first speaker. In some examples, the set of features may correspond to features collected during different time frames. In some examples, the set of features may include at least one of frequency shift, amplitude shift, log-mel coefficients, or mel-frequency cepstral coefficients.

Figure 18:
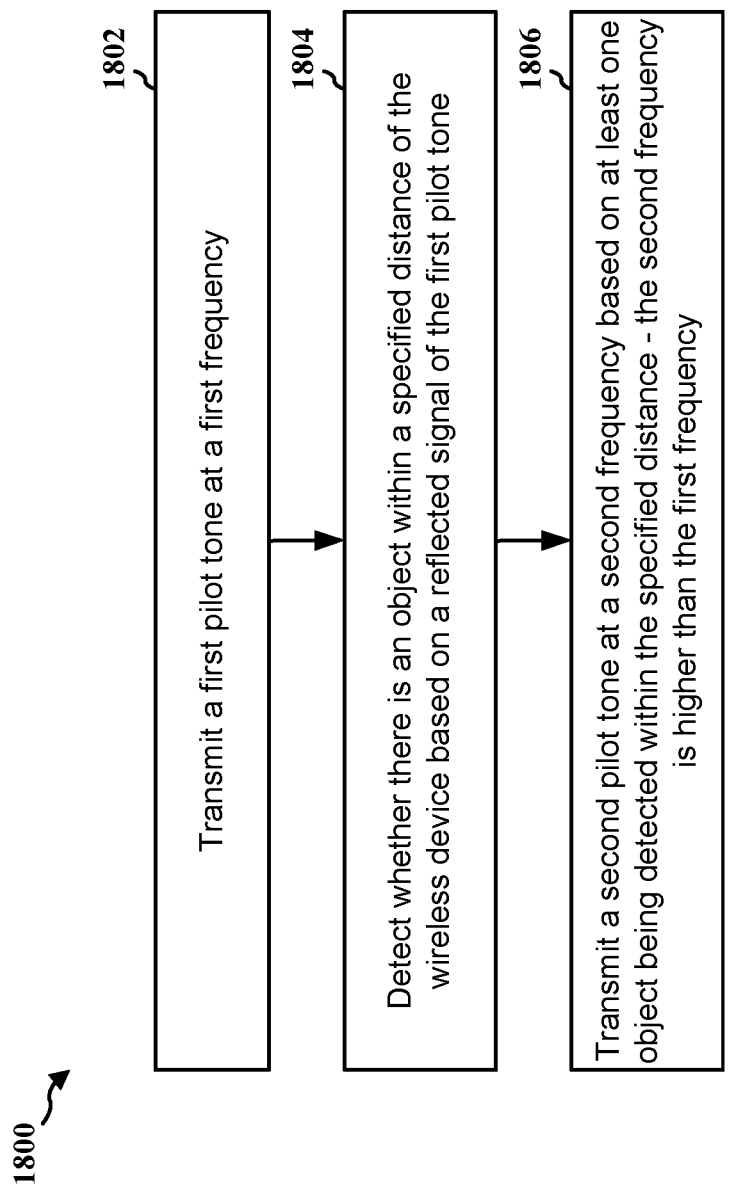
FIG. 18 is a flowchart of a method of wireless communication.

FIG. 18 is a flowchart 1800 of a method of wireless communication. The method may be performed by a wireless device (e.g., the UE 104, 404; the acoustic echo detection system 502, 602; the apparatus 1904). The method may enable the wireless device to dynamically change the frequencies of its pilot tones based on the distance of one or more objects detected, thereby enabling the wireless device to utilize the advantages of both high frequency pilot tone and low frequency pilot tone.

At 1802, the wireless device may transmit a first pilot tone at a first frequency, such as described in connection with FIGS. 6-8. For example, as shown by FIG. 6, the acoustic echo detection system 602 may inject (e.g., transmit) a low frequency pilot tone 620 from the first speaker 604. The means for transmitting the first pilot tone may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

At 1804, the wireless device may detect whether there is an object within a specified distance of the wireless device based on a reflected signal of the first pilot tone, such as described in connection with FIGS. 6-8. For example, as shown by FIG. 7, the acoustic echo detection system 602 may detect a person 624 and object 626 that is within its detection distance (e.g., 6 meters) based on the echoes of the low frequency pilot tone 620 (e.g., reflected from the person 624 and the object 626). The means for detecting whether there is an object within a specified distance may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

In one example, to detect whether there is the object within the specified distance based on the first pilot tone, the wireless device may receive the reflected signal of the first pilot tone from the at least one object, calculate a distance of the at least one object with respect to the wireless device based the reflected signal of the first pilot tone, and determine that the at least one object is within the specified distance if the calculated distance is within the specified distance.

In another example, to detect whether there is the object within the specified distance of the wireless device based on the reflected signal of the first pilot tone, the wireless device may identify that the reflected signal is associated with the object based on source separation. In some implementations, the reflected signal may be identified as being associated with the object based on source separation.

At 1806, the wireless device may transmit a second pilot tone at a second frequency based on at least one object being detected within the specified distance, where the second frequency is higher than the first frequency, such as described in connection with FIGS. 6-8. For example, as shown by FIG. 8, in response to the person 624 and/or the object 626 being detected, acoustic echo detection system 602 may transmit a higher frequency pilot tone 632 and/or a higher frequency pilot tone 634. The means for transmitting the second pilot tone may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

In one example, the wireless device may estimate at least one of a size, a direction, or a distance of the at least one object based on a machine learning model, and the wireless device may transmit the second pilot tone further based on the size, the direction, the distance, or combinations thereof of the at least one object. In some implementations, the direction of the at least one object may be indicative of whether the at least one object is approaching or moving away from the wireless device.

In another example, the wireless device may calculate a first distance of the at least one object with respect to the wireless device based the second pilot tone, such as described in connection with FIGS. 6-8. For example, as shown by FIG. 8, the acoustic echo detection system 602 may calculate the distance of the person 624 and/or the distance of the object 626 further based on the echoes of the high frequency pilot tones 632 and/or 634. The means for calculating the first distance of the at least one object may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

In another example, the wireless device may transmit a third pilot tone at a third frequency based on the at least one object being detected within the specified distance, where the third frequency may be higher than the first frequency and different from the second frequency, and the wireless device may calculate a second distance of the at least one object with respect to the wireless device based the third pilot tone. In some implementations, the first pilot tone may be transmitted via a first speaker, the second pilot tone may be transmitted via a second speaker, and the third pilot tone may be transmitted via a third speaker.

In another example, the wireless device may stop transmitting the second pilot tone based on the at least one object being no longer within the specified distance, such as described in connection with FIGS. 6-8. For example, as shown by FIG. 8, if the person 624 and/or the object 626 are no longer within the detection range of the acoustic echo detection system 602, the acoustic echo detection system 602 may stop transmitting the high frequency pilot tones 632 and/or 634. The means for stopping transmitting the second pilot tone may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

In another example, the wireless device may detect the at least one object includes a human, and the wireless device may inject an inverse signal of the first pilot tone, such as described in connection with FIG. 16. For example, as shown at 1604 of FIG. 16, an acoustic echo detection system may inject inverse signal of the pilot tone if a human is detected. The means for detecting the at least one object includes a human and/or the means for injecting the inverse signal of the first pilot tone may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

In another example, the wireless device may transmit the first pilot tone with a longer periodicity if no object is detected within the specified distance of the wireless device in a specified time period, such as described in connection with FIG. 9. For example, as shown at 904 of FIG. 9, the acoustic echo detection system 602 may transmit the low frequency pilot tone with a longer periodicity if no object is detected in the area. The means for transmitting the first pilot tone with a longer periodicity may be performed by, e.g., the acoustic echo detection component 198, the application processor 1906, the cellular baseband processor 1924, the speaker(s) 1934, the microphone(s) 1936, and/or the transceiver(s) 1922 of the apparatus 1904 in FIG. 19.

In another example, the wireless device may transmit the second pilot tone with a shorter periodicity if the at least one object is detected within a second specified distance of the wireless device.

In another example, the first pilot tone may be initially transmitted via a first speaker and the second pilot tone may be initially transmitted via a second speaker. The wireless device may detect that the at least one object is approaching the first speaker, and the wireless device may switch transmission of the first pilot tone to the second speaker and transmission of the second pilot tone to the first speaker based on the at least one object approaching the first speaker. In some implementations, to detect that the at least one object is moving toward the first speaker, the wireless device may transmit, to a neural network, a set of features associated with the at least one object, the first speaker, the second speaker, or a combination thereof. Then, the wireless device may receive, from the neural network, an indication or an inference that the at least one object is approaching the first speaker. In some examples, the set of features may correspond to features collected during different time frames. In some examples, the set of features may include at least one of frequency shift, amplitude shift, log-mel coefficients, or mel-frequency cepstral coefficients.

Figure 19:
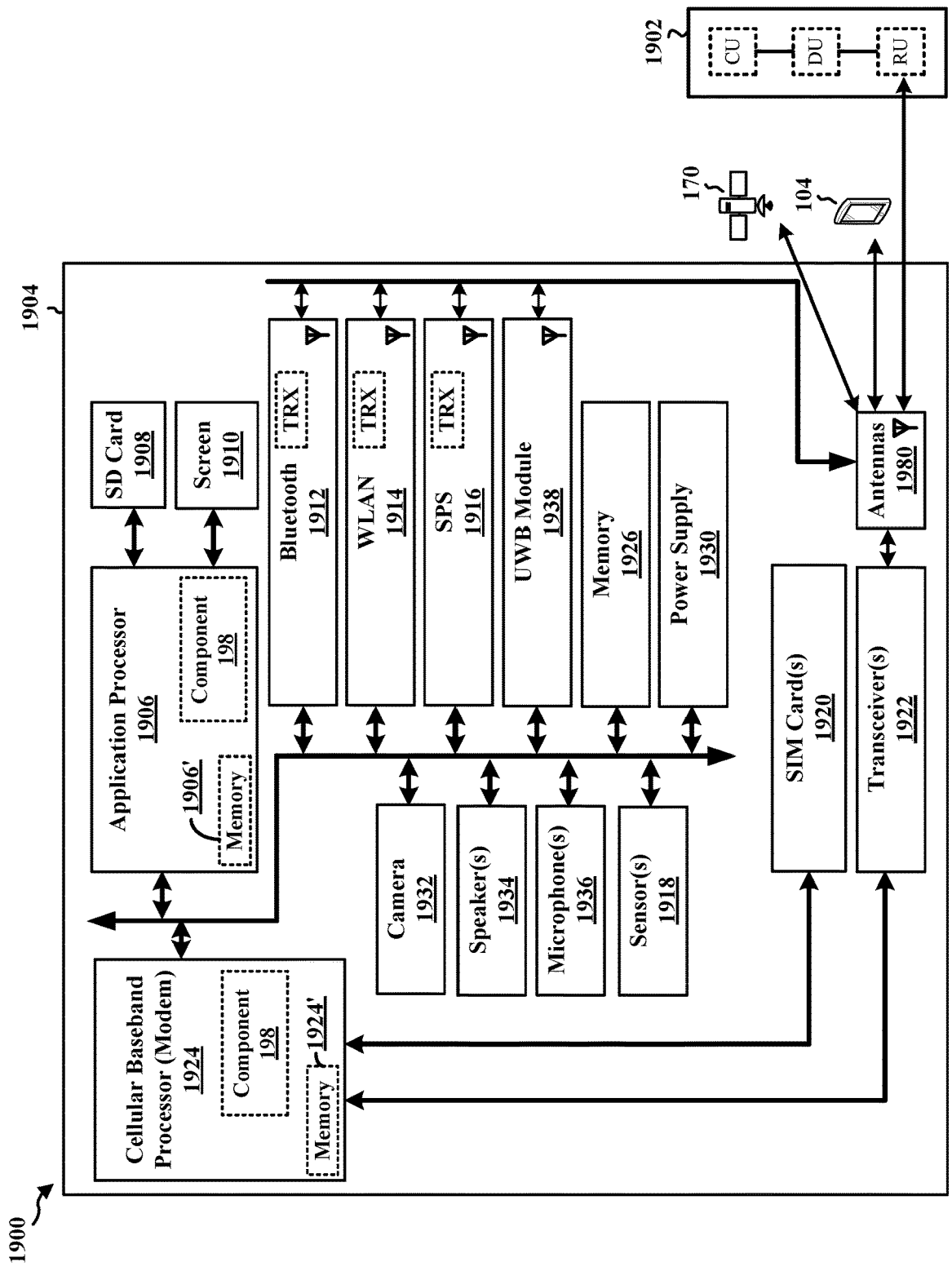
FIG. 19 is a diagram illustrating an example of a hardware implementation for an example apparatus and/or network entity.

FIG. 19 is a diagram 1900 illustrating an example of a hardware implementation for an apparatus 1904. The apparatus 1904 may be a UE, a component of a UE, or may implement UE functionality. In some aspects, the apparatus 1904 may include a cellular baseband processor 1924 (also referred to as a modem) coupled to one or more transceivers 1922 (e.g., cellular RF transceiver). The cellular baseband processor 1924 may include on-chip memory 1924'. In some aspects, the apparatus 1904 may further include one or more subscriber identity modules (SIM) cards 1920 and an application processor 1906 coupled to a secure digital (SD) card 1908 and a screen 1910. The application processor 1906 may include on-chip memory 1906'. In some aspects, the apparatus 1904 may further include one or more speaker(s) 1934 and one or more microphone(s) 1936. In some aspects, the apparatus 1904 may further include a Bluetooth module 1912, a WLAN module 1914, a Ultrawideband (UWB) module 1938, an SPS module 1916 (e.g., GNSS module), one or more sensor modules 1918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1926, a power supply 1930, and/or a camera 1932. The Bluetooth module 1912, the WLAN module 1914, and the SPS module 1916 may include an on-chip transceiver (TRX) (or in some cases, just a receiver (RX)). The Bluetooth module 1912, the WLAN module 1914, and the SPS module 1916 may include their own dedicated antennas and/or utilize the antennas 1980 for communication. The cellular baseband processor 1924 communicates through the transceiver(s) 1922 via one or more antennas 1980 with the UE 104 and/or with an RU associated with a network entity 1902. The cellular baseband processor 1924 and the application processor 1906 may each include a computer-readable medium/memory 1924', 1906', respectively. The additional memory modules 1926 may also be considered a computer-readable medium/memory. Each computer-readable medium/memory 1924', 1906', 1926 may be non-transitory. The cellular baseband processor 1924 and the application processor 1906 are each responsible for general processing, including the execution of software stored on the computer-readable medium/memory. The software, when executed by the cellular baseband processor 1924/application processor 1906, causes the cellular baseband processor 1924/application processor 1906 to perform the various functions described supra. The computer-readable medium/memory may also be used for storing data that is manipulated by the cellular baseband processor 1924/application processor 1906 when executing software. The cellular baseband processor 1924/application processor 1906 may be a component of the UE 350 and may include the memory 360 and/or at least one of the TX processor 368, the RX processor 356, and the controller/processor 359. In one configuration, the apparatus 1904 may be a processor chip (modem and/or application) and include just the cellular baseband processor 1924 and/or the application processor 1906, and in another configuration, the apparatus 1904 may be the entire UE (e.g., see 350 of FIG. 3) and include the additional modules of the apparatus 1904.

As discussed supra, the acoustic echo detection component 198 is configured to transmit a first pilot tone at a first frequency. The acoustic echo detection component 198 may also be configured to detect whether there is an object within a specified distance of the wireless device based on a reflected signal of the first pilot tone. The acoustic echo detection component 198 may also be configured to transmit a second pilot tone at a second frequency based on at least one object being detected within the specified distance, where the second frequency is higher than the first frequency. The acoustic echo detection component 198 may be within the cellular baseband processor 1924, the application processor 1906, or both the cellular baseband processor 1924 and the application processor 1906. The acoustic echo detection component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1904 may include a variety of components configured for various functions. In one configuration, the apparatus 1904, and in particular the cellular baseband processor 1924 and/or the application processor 1906, includes means for transmitting a first pilot tone at a first frequency. The apparatus 1904 may further include means for detecting whether there is an object within a specified distance of the wireless device based on a reflected signal of the first pilot tone. The apparatus 1904 may further include means for transmitting a second pilot tone at a second frequency based on at least one object being detected within the specified distance, where the second frequency is higher than the first frequency.

In one configuration, the apparatus 1904 may further include means for calculating a first distance of the at least one object with respect to the wireless device based the second pilot tone.

In another configuration, the means for detecting whether there is the object within the specified distance based on the first pilot tone includes configuring the apparatus 1904 to receive the reflected signal of the first pilot tone from the at least one object, calculate a distance of the at least one object with respect to the wireless device based the reflected signal of the first pilot tone, and determine that the at least one object is within the specified distance if the calculated distance is within the specified distance.

In another configuration, the means for detecting whether there is the object within the specified distance of the wireless device based on the reflected signal of the first pilot tone includes configuring the apparatus 1904 to identify that the reflected signal is associated with the object based on source separation. In some implementations, the reflected signal may be identified as being associated with the object based on source separation.

In another configuration, the apparatus 1904 may further include means for estimating at least one of a size, a direction, or a distance of the at least one object based on a machine learning model, and means for transmitting the second pilot tone further based on the size or the direction of the at least one object. In some implementations, the direction of the at least one object may be indicative of whether the at least one object is approaching or moving away from the wireless device.

In another configuration, the apparatus 1904 may further include means for transmitting a third pilot tone at a third frequency based on the at least one object being detected within the specified distance, where the third frequency may be higher than the first frequency and different from the second frequency, and means for calculating a second distance of the at least one object with respect to the wireless device based the third pilot tone. In some implementations, the first pilot tone may be transmitted via a first speaker, the second pilot tone may be transmitted via a second speaker, and the third pilot tone may be transmitted via a third speaker.

In another configuration, the apparatus 1904 may further include means for stopping transmitting the second pilot tone based on the at least one object being no longer within the specified distance.

In another configuration, the apparatus 1904 may further include means for detecting the at least one object includes a human, and means for injecting an inverse signal of the first pilot tone.

In another configuration, the apparatus 1904 may further include means for transmitting the first pilot tone with a longer periodicity if no object is detected within the specified distance of the wireless device in a specified time period.

In another configuration, the apparatus 1904 may further include means for transmitting the second pilot tone with a shorter periodicity if the at least one object is detected within a second specified distance of the wireless device.

In another configuration, the first pilot tone may be initially transmitted via a first speaker and the second pilot tone may be initially transmitted via a second speaker. The apparatus 1904 may further include means for detecting that the at least one object is approaching the first speaker, and means for switching transmission of the first pilot tone to the second speaker and transmission of the second pilot tone to the first speaker based on the at least one object approaching the first speaker. In some implementations, to means for detecting that the at least one object is moving toward the first speaker may include configuring the apparatus 1904 to transmit, to a neural network, a set of features associated with the at least one object, the first speaker, the second speaker, or a combination thereof, and receive, from the neural network, an indication or an inference that the at least one object is approaching the first speaker. In some configurations, the set of features may correspond to features collected during different time frames. In some configurations, the set of features may include at least one of frequency shift, amplitude shift, log-mel coefficients, or mel-frequency cepstral coefficients.

The means may be the acoustic echo detection component 198 of the apparatus 1904 configured to perform the functions recited by the means. As described supra, the apparatus 1904 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a wireless device, including: transmitting a first pilot tone at a first frequency; detecting whether there is an object within a specified distance of the wireless device based on a reflected signal of the first pilot tone; and transmitting a second pilot tone at a second frequency based on at least one object being detected within the specified distance, where the second frequency is higher than the first frequency.

Aspect 2 is the method of aspect 1, further including: calculating a first distance of the at least one object with respect to the wireless device based the second pilot tone.

Aspect 3 is the method of aspect 1 or 2, further including: transmitting a third pilot tone at a third frequency based on the at least one object being detected within the specified distance, where the third frequency is higher than the first frequency and different from the second frequency; and calculating a second distance of the at least one object with respect to the wireless device based the third pilot tone.

Aspect 4 is the method of aspect 3, where the first pilot tone is transmitted via a first speaker, the second pilot tone is transmitted via a second speaker, and the third pilot tone is transmitted via a third speaker.

Aspect 5 is the method of any of aspects 1 to 4, where detecting whether there is the object within the specified distance based on the first pilot tone includes: receiving the reflected signal of the first pilot tone from the at least one object; calculating a distance of the at least one object with respect to the wireless device based the reflected signal of the first pilot tone; and determining that the at least one object is within the specified distance if the calculated distance is within the specified distance.

Aspect 6 is the method of any of aspects 1 to 5, further including: estimating at least one of a size, a direction, or a distance of the at least one object based on a machine learning (ML) model; and transmitting the second pilot tone further based on the size or the direction of the at least one object.

Aspect 7 is the method of aspect 6, where the direction of the at least one object is indicative of whether the at least one object is approaching or moving away from the wireless device.

Aspect 8 is the method of any of aspects 1 to 7, further including: stopping transmitting the second pilot tone based on the at least one object being no longer within the specified distance.

Aspect 9 is the method of any of aspects 1 to 8, further including: detecting the at least one object includes a human; and injecting an inverse signal of the first pilot tone.

Aspect 10 is the method of aspect 9, where detecting whether there is the object within the specified distance of the wireless device based on the reflected signal of the first pilot tone includes: identifying that the reflected signal is associated with the object.

Aspect 11 is the method of aspect 10, where the reflected signal is identified as being associated with the object based on an ML model.

Aspect 12 is the method of any of aspects 1 to 10, further including: transmitting the first pilot tone with a longer periodicity if no object is detected within the specified distance of the wireless device in a specified time period.

Aspect 13 is the method of any of aspects 1 to 12, further including: transmitting the second pilot tone with a shorter periodicity if the at least one object is detected within a second specified distance of the wireless device.

Aspect 14 is the method of any of aspects 1 to 13, where the first pilot tone is initially transmitted via a first speaker and the second pilot tone is initially transmitted via a second speaker, the method further including: detecting that the at least one object is approaching the first speaker; and switching transmission of the first pilot tone to the second speaker and transmission of the second pilot tone to the first speaker based on the at least one object approaching the first speaker.

Aspect 15 is the method of aspect 14, where detecting that the at least one object is moving toward the first speaker includes: providing, to a NN, a set of features associated with the at least one object, the first speaker, the second speaker, or a combination thereof; and receiving, from the NN, an indication or an inference that the at least one object is approaching the first speaker.

Aspect 16 is the method of aspect 15, where the set of features corresponds to features collected during different time frames.

Aspect 17 is the method of aspect 15, where the set of features include at least one of a frequency shift, an amplitude shift, log-mel coefficients, or mel-frequency cepstral coefficients.

Aspect 18 is an apparatus for wireless communication at a wireless device, including: a memory; and at least one processor coupled to the memory and, based at least in part on information stored in the memory, the at least one processor is configured to implement any of aspects 1 to 17.

Aspect 19 is the apparatus of aspect 18, further including at least one of a transceiver or an antenna coupled to the at least one processor.

Aspect 20 is an apparatus for wireless communication including means for implementing any of aspects 1 to 17.

Aspect 21 is a computer-readable medium (e.g., a non-transitory computer-readable medium) storing computer executable code, where the code when executed by a processor causes the processor to implement any of aspects 1 to 17.

What is claimed is:

1. An apparatus for wireless communication at a wireless device, comprising:
at least one memory; and
at least one processor coupled to the at least one memory, the at least one processor is configured to:
transmit a first pilot tone via a first speaker at a first frequency;
detect whether there is an object within a specified distance of the wireless device based on a reflected signal of the first pilot tone;
transmit a second pilot tone via a second speaker at a second frequency based on at least one object being detected within the specified distance, wherein the second frequency is higher than the first frequency;
detect that the at least one object is approaching the first speaker; and
switch transmission of the first pilot tone to the second speaker and transmission of the second pilot tone to the first speaker based on the at least one object approaching the first speaker.

2. The apparatus of claim 1, wherein the at least one processor is further configured to:
calculate a first distance of the at least one object with respect to the wireless device based the second pilot tone.

3. The apparatus of claim 2, wherein the at least one processor is further configured to:
transmit a third pilot tone at a third frequency based on the at least one object being detected within the specified distance, wherein the third frequency is higher than the first frequency and different from the second frequency; and
calculate a second distance of the at least one object with respect to the wireless device based the third pilot tone.

4. The apparatus of claim 3, wherein the at least one processor is configured to transmit the third pilot tone via a third speaker.

5. The apparatus of claim 1, wherein to detect whether there is the object within the specified distance based on the first pilot tone, the at least one processor is configured to:
receive the reflected signal of the first pilot tone from the at least one object;
calculate a distance of the at least one object with respect to the wireless device based the reflected signal of the first pilot tone; and
determine that the at least one object is within the specified distance if the calculated distance is within the specified distance.

6. The apparatus of claim 1, wherein the at least one processor is further configured to:
estimate at least one of a size, a direction, or a distance of the at least one object based on a machine learning (ML) model; and
transmit the second pilot tone further based on the size, the direction, the distance, or combinations thereof of the at least one object.

7. The apparatus of claim 6, wherein the direction of the at least one object is indicative of whether the at least one object is approaching or moving away from the wireless device.

8. The apparatus of claim 1, wherein the at least one processor is further configured to:
stop transmitting the second pilot tone based on the at least one object being no longer within the specified distance.

9. The apparatus of claim 1, wherein the at least one processor is further configured to:
detect the at least one object includes a human; and
inject an inverse signal of the first pilot tone.

10. The apparatus of claim 1, wherein to detect whether there is the object within the specified distance of the wireless device based on the reflected signal of the first pilot tone, the at least one processor is configured to:
identify that the reflected signal is associated with the object based on separating the reflected signal from a plurality of signals using source separation.

11. The apparatus of claim 10, wherein the at least one processor is configured to identify that the reflected signal is associated with the object based on a machine learning (ML) model.

12. The apparatus of claim 1, wherein the at least one processor is further configured to:
transmit the first pilot tone with a longer periodicity if no object is detected within the specified distance of the wireless device in a specified time period.

13. The apparatus of claim 1, wherein the at least one processor is further configured to:
transmit the second pilot tone with a shorter periodicity if the at least one object is detected within a second specified distance of the wireless device.

14. The apparatus of claim 1, wherein to detect that the at least one object is moving toward the first speaker, the at least one processor is configured to:
provide, to a neural network (NN), a set of features associated with the at least one object, the first speaker, the second speaker, or a combination thereof; and
receive, from the NN, an indication or an inference that the at least one object is approaching the first speaker.

15. The apparatus of claim 14, wherein the set of features corresponds to features collected during different time frames.

16. The apparatus of claim 14, wherein the set of features includes at least one of a frequency shift, an amplitude shift, log-mel coefficients, or mel-frequency cepstral coefficients.

17. A method of wireless communication at a wireless device, comprising:
transmitting a first pilot tone via a first speaker at a first frequency;
detecting whether there is an object within a specified distance of the wireless device based on a reflected signal of the first pilot tone;
transmitting a second pilot tone via a second speaker at a second frequency based on at least one object being detected within the specified distance, wherein the second frequency is higher than the first frequency;
detecting that the at least one object is approaching the first speaker; and
switching transmission of the first pilot tone to the second speaker and transmission of the second pilot tone to the first speaker based on the at least one object approaching the first speaker.

18. The method of claim 17, further comprising:
calculating a first distance of the at least one object with respect to the wireless device based the second pilot tone.

19. The method of claim 18, further comprising:
transmitting a third pilot tone at a third frequency based on the at least one object being detected within the specified distance, wherein the third frequency is higher than the first frequency and different from the second frequency; and
calculating a second distance of the at least one object with respect to the wireless device based the third pilot tone.

20. The method of claim 17, wherein detecting whether there is the object within the specified distance based on the first pilot tone comprises:
receiving the reflected signal of the first pilot tone from the at least one object;
calculating a distance of the at least one object with respect to the wireless device based the reflected signal of the first pilot tone; and
determining that the at least one object is within the specified distance if the calculated distance is within the specified distance.

21. The method of claim 17, further comprising:
estimating at least one of a size, a direction, or a distance of the at least one object based on a machine learning (ML) model; and
transmitting the second pilot tone further based on the size or the direction of the at least one object.

22. The method of claim 17, further comprising:
stopping transmitting the second pilot tone based on the at least one object being no longer within the specified distance.

23. The method of claim 17, further comprising:
detecting the at least one object includes a human; and
injecting an inverse signal of the first pilot tone.

24. The method of claim 17, wherein detecting whether there is the object within the specified distance of the wireless device based on the reflected signal of the first pilot tone comprises:
identifying that the reflected signal is associated with the object based on separating the reflected signal from a plurality of signals using source separation.

25. The method of claim 17, further comprising:
transmitting the first pilot tone with a longer periodicity if no object is detected within the specified distance of the wireless device in a specified time period.

26. The method of claim 17, wherein detecting that the at least one object is moving toward the first speaker comprises:
providing, to a neural network (NN), a set of features associated with the at least one object, the first speaker, the second speaker, or a combination thereof, and
receiving, from the NN, an indication or an inference that the at least one object is approaching the first speaker.

27. An apparatus for wireless communication at a wireless device, comprising:
means for transmitting a first pilot tone via a first speaker at a first frequency;
means for detecting whether there is an object within a specified distance of the wireless device based on a reflected signal of the first pilot tone;
means for transmitting a second pilot tone via a second speaker at a second frequency based on at least one object being detected within the specified distance, wherein the second frequency is higher than the first frequency;
means for detecting that the at least one object is approaching the first speaker; and
means for switching transmission of the first pilot tone to the second speaker and transmission of the second pilot tone to the first speaker based on the at least one object approaching the first speaker.

28. A non-transitory computer-readable medium storing computer executable code at a wireless device, the code when executed by a processor causes the processor to:
transmit a first pilot tone via a first speaker at a first frequency;
detect whether there is an object within a specified distance of the wireless device based on a reflected signal of the first pilot tone;
transmit a second pilot tone via a second speaker at a second frequency based on at least one object being detected within the specified distance, wherein the second frequency is higher than the first frequency;
detect that the at least one object is approaching the first speaker; and
switch transmission of the first pilot tone to the second speaker and transmission of the second pilot tone to the first speaker based on the at least one object approaching the first speaker.

29. The method of claim 26, wherein the set of features corresponds to features collected during different time frames.

30. The method of claim 26, wherein the set of features includes at least one of a frequency shift, an amplitude shift, log-mel coefficients, or mel-frequency cepstral coefficients.

* * * * *